US012665534B1

(12) United States Patent
Shaw et al.

(10) Patent No.: US 12,665,534 B1
(45) Date of Patent: Jun. 23, 2026

(54) TAPPED STATOR AXIAL MOTOR AND DRIVE FOR EXTENDED OPERATING RANGE

(71) Applicant: E-Circuit Motors, Inc., Needham Heights, MA (US)

(72) Inventors: Steven Robert Shaw, Bozeman, MT (US); Eric Ponce, Belgrade, MT (US); George Harder Milheim, Bozeman, MT (US)

(73) Assignee: E-Circuit Motors, Inc., Needham Heights, MA (US)

( * ) Notice: Subject to any disclaimer, the term of this patent is extended or adjusted under 35 U.S.C. 154(b) by 0 days.

(21) Appl. No.: 19/357,271

(22) Filed: Oct. 14, 2025

Related U.S. Application Data

(60) Provisional application No. 63/798,969, filed on May 2, 2025.

(51) Int. Cl.
 H02P 27/06 (2006.01)
(52) U.S. Cl.
 CPC .................................. H02P 27/06 (2013.01)
(58) Field of Classification Search
 CPC .. H02P 27/06; H02P 1/20; H02P 25/18; H02P 25/188; H02P 7/05; H02P 25/22; H02P 25/022; H02P 3/20; H02K 23/26; H02K 15/0025
 USPC ....... 318/494, 495, 288, 290, 297, 724, 748, 318/754
 See application file for complete search history.

(56) References Cited

U.S. PATENT DOCUMENTS

| | | | |
|---|---|---|---|
| 4,737,701 | A | 4/1988 | Hoemann et al. |
| 7,109,625 | B1 | 9/2006 | Jore et al. |
| 8,232,696 | B2 | 7/2012 | Shinkawa |

(Continued)

FOREIGN PATENT DOCUMENTS

| | | |
|---|---|---|
| CN | 117767624 A | 3/2024 |
| JP | 2007236179 A | 9/2007 |

(Continued)

OTHER PUBLICATIONS

Ohashi et al. (WO 2019159836 A1) Power Conversion Device, Drive Device, and Power Steering Device (Year: 2019).*

(Continued)

*Primary Examiner* — Jorge L Carrasquillo
(74) *Attorney, Agent, or Firm* — Pierce Atwood LLP

(57) ABSTRACT

A rotary energy conversion device may include an armature, a first inverter circuit, a second inverter circuit, and at least one switch. The armature may include at least a first winding segment and a second winding segment that are each configured to generate magnetic flux when energized, the second winding segment being connected in series with the first winding segment. The first inverter circuit may be configured to energize both the first winding segment and the second winding segment during a first mode of operation of the rotary energy conversion device. The second inverter circuit may be configured to energize the second winding segment but not the first winding segment during a second mode of operation of the rotary energy conversion device. The at least one switch may be configured and arranged to decouple of the first inverter circuit from the second inverter circuit during the second mode of operation.

28 Claims, 11 Drawing Sheets

(56) References Cited

U.S. PATENT DOCUMENTS

| | | | |
|---|---|---|---|
| 8,242,725 | B2 | 8/2012 | Thompson et al. |
| 9,473,052 | B2 | 10/2016 | Sato |
| 9,673,688 | B2 | 6/2017 | Shaw |
| 9,800,109 | B2 | 10/2017 | Shaw |
| 9,812,981 | B2 | 11/2017 | Ritchey et al. |
| 10,170,953 | B2 | 1/2019 | Shaw |
| 10,211,694 | B1 | 2/2019 | Shaw |
| 11,005,322 | B2 | 5/2021 | Milheim et al. |
| 11,121,614 | B2 | 9/2021 | Milheim |
| 11,336,130 | B1 | 5/2022 | Shaw et al. |
| 11,342,813 | B2 | 5/2022 | Steg et al. |
| 11,527,933 | B2 | 12/2022 | Shaw et al. |
| 11,626,779 | B2 | 4/2023 | Shaw et al. |
| 11,751,330 | B2 | 9/2023 | Milheim et al. |
| 12,170,459 | B2 | 12/2024 | McElveen et al. |
| 2008/0116759 | A1 | 5/2008 | Lin |
| 2012/0068657 | A1 | 3/2012 | Fulton et al. |
| 2019/0229670 | A1* | 7/2019 | Arisawa ............... H02P 27/08 |
| 2020/0251947 | A1 | 8/2020 | Zuniga Mangas et al. |
| 2021/0203213 | A1 | 7/2021 | Jore et al. |
| 2021/0265937 | A1* | 8/2021 | Kashiwazaki ...... H02M 1/0054 |
| 2021/0351658 | A1 | 11/2021 | Jore et al. |
| 2023/0246525 | A1 | 8/2023 | Shaw et al. |
| 2025/0119008 | A1 | 4/2025 | Chowdhury et al. |

FOREIGN PATENT DOCUMENTS

| | | |
|---|---|---|
| JP | 5292060 B2 | 9/2013 |
| JP | 5527488 B2 | 6/2014 |
| WO | 2009048619 A1 | 4/2009 |
| WO | 2024254706 A1 | 12/2024 |

OTHER PUBLICATIONS

Kato (JP 2021180596 A) Rotary Electric Machine (Year: 2021).*

Jeong et al. (KR 20230119442 A) Motor Driving Apparatus and Method (Year: 2023).*

* cited by examiner

TAPPED STATOR AXIAL MOTOR AND DRIVE FOR EXTENDED OPERATING RANGE

RELATED APPLICATIONS

This application claims the benefit under 35 U.S.C. § 119(e) of U.S. Provisional Application Ser. No. 63/798,969, entitled TAPPED STATOR AXIAL MOTOR AND DRIVE FOR EXTENDED OPERATING RANGE, filed May 2, 2025, the entire contents of which are incorporated herein by reference for all purposes.

BACKGROUND

Axial flux motors and generators described by several patents, including U.S. Pat. Nos. 7,109,625; 9,673,688; 9,800,109; 10,170,953; 10,211,694; 11,005,322; 11,121, 614; 11, 336,130; 11,527,933; 11,626,779; 11,751,330, the entire contents of which are incorporated herein by reference, feature a generally planar printed circuit board stator (PCB) assembly interposed between magnets magnetized with alternating north-south poles.

SUMMARY

In some aspects, the techniques described herein relate to a rotary energy conversion device, including: an armature including at least a first winding segment and a second winding segment that are each configured to generate magnetic flux when energized, the second winding segment being connected in series with the first winding segment; a first inverter circuit configured to energize both the first winding segment and the second winding segment during a first mode of operation of the rotary energy conversion device; a second inverter circuit configured to energize the second winding segment but not the first winding segment during a second mode of operation of the rotary energy conversion device; and at least one switch configured and arranged to decouple of the first inverter circuit from the second inverter circuit during the second mode of operation.

In some aspects, the techniques described herein relate to a method for operating a rotary energy conversion device including an armature including at least a first winding segment and a second winding segment that are each configured to generate magnetic flux when energized, the second winding segment being connected in series with the first winding segment, the method including: operating a first inverter circuit to energize both the first winding segment and the second winding segment during a first mode of operation of the rotary energy conversion device; operating a second inverter circuit to energize the second winding segment but not the first winding segment during a second mode of operation of the rotary energy conversion device; and using at least one switch to decouple the first inverter circuit from the second inverter circuit during the second mode of operation.

DETAILED DESCRIPTION

Figure 1:
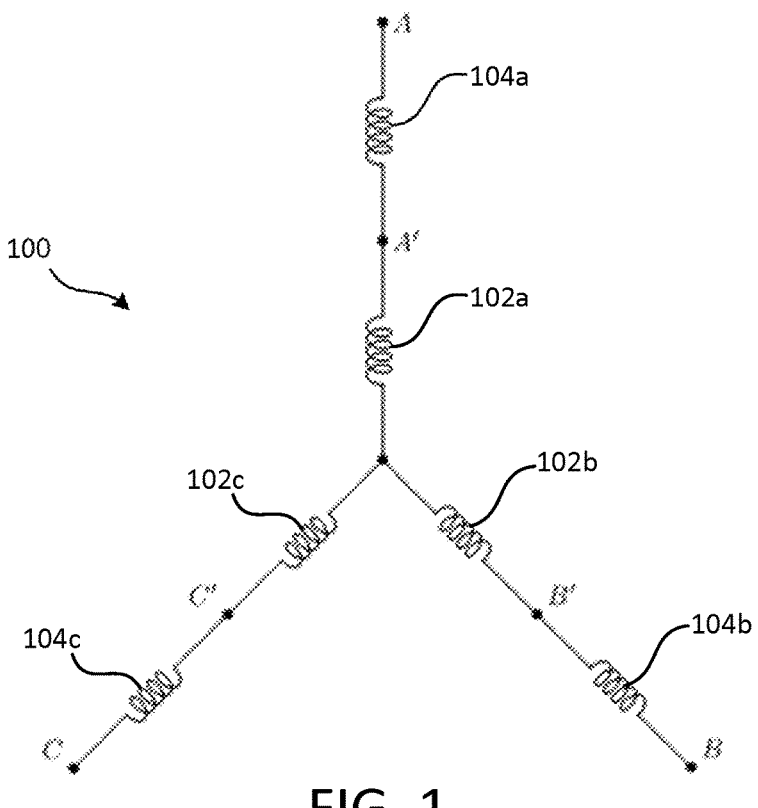
FIG. 1 shows a first example tapped stator having a 3-phase wye configuration.

Tapped winding stators are described by several published patent applications, including U.S. Patent Application Publication Nos. 2008/0116759; US2020/0251947; and US2012/0068657A1, and feature a plurality of coils tapped in a configuration that allows the stator to selectively bypass one or more of the plurality of coils in operation. Motors utilizing such stator taps to selectively bypass coils can adjust their operating characteristics to maintain constant rated power operation over a larger operating speed range. Generators utilizing stator taps to selectively bypass coils can dynamically adjust their operating characteristics in response to different driving sources and achieve maximum power conversion efficiency. In the most common case, tapped stators (and transformers) are configured at installation to match application requirements, or are reconfigured using the taps at a rate which is relatively slow compared to the switching frequency.

Historically, motors have been configured to vary their torque/speed/current/voltage relationships in real time using means other than tap switching. As an example, a field wound direct current (DC) machine is similar to a permanent magnet DC machine, except the magnets are replaced with field windings on soft magnetic yokes. Varying the field current allows a variety of effects, such as soft start characteristics, and torque-speed characteristics amenable to loads such as winches and hoists. Another technique involves "field weakening." In this case, for example in a brushless DC motor (BLDC), a current is introduced in the switching waveforms that tends to cancel, or weaken, the flux density that contributes to torque production. For this technique to be practical, the machine must have a substantial armature reaction, i.e., the losses incurred by weakening the field must be tolerable. This is generally not the case for a PCB stator air-core machine.

Offered are systems and techniques for configuring a tapped stator, e.g., a PCB stator for an air core machine, and integrating such a tapped stator with a suitable power electronic drive to achieve a variety of output characteristics. In general, the disclosed techniques may allow a stator, e.g., a PCB stator, to approximate constant power output over a wide range of speeds, operate over a wider range of speeds within the constraints of a given voltage source and pulse width modulation (PWM) resolution, and similar.

The present disclosure describes a motor assembly, e.g., a planar PCB stator motor assembly, with a tapped configuration and an associated power electronic circuit including at least two inverter bridges configured to selectively drive (or be driven by) different sets of windings via the taps. For example, in some implementations, a first inverter bridge can be used to drive a first set of windings during a lower-speed, higher-torque operational mode and a second inverter bridge can be used to drive a second set of windings during a higher-speed, lower-torque operational mode. Advantageously, in some such implementations, one or more switches (which may be implemented using transistors or, in some cases, simply diodes) may be positioned between the high voltage rails of the two inverter bridges and/or between the low voltage rails of the two inverter bridges so as to preclude body diodes inherent in the switches of the first inverter bridge from adversely impacting the operation of the second inverter bridge.

The purpose and effect of such "decoupling" switches is described in detail below. Using the disclosed configuration, a controller can effectively "switch in" a motor (or generator) with different characteristics when doing so suits the operating condition. The motor/generator characteristics that may be changed in this fashion include the resistance, the phase configuration, and the effective coefficient relating current and torque and speed and voltage.

One beneficial aspect of the combined system comprising the tapped stator, the inverter bridges, and the decoupling switch(es) is that the system may have some of the characteristics of operation associated with "field weakening" control in standard BLDC machines. The technique described here differs, however, in that the tap allows the selective elimination of current from portions of the winding. If a portion of the winding is not used, but the current remains the same in a given phase, the effect may be to reduce the current density in the stator while leaving the field from the magnet unchanged. A simplistic comparison can be had by considering the torque density, as follows:

$$\tau_{dens} = r \times J \times B$$

Here, $\tau_{dens}$ is the torque density of electromagnetic origin, J is the current density in the stator, related to the terminal current by the winding, r is the radius, and B is the air-gap flux density seen by the stator. The volume integral of this expression gives the torque developed by the machine. If there is a mechanism for changing B, such as field weakening, then the relationship between current I supplied to the machine and torque can be adjusted. Alternatively, if the stator is reconfigured using taps such that there is a different relationship between I and J, then essentially the same effect can be achieved. This assumes small armature reaction, which is generally the case for PCB stator machines. The relationship between voltage and speed is also changed for the tapped winding, in an analogous fashion.

Appropriate control of the motor via taps and the full winding may offer some intriguing possibilities that mitigate toward the co-design of power electronics and machine.

Figure 2:
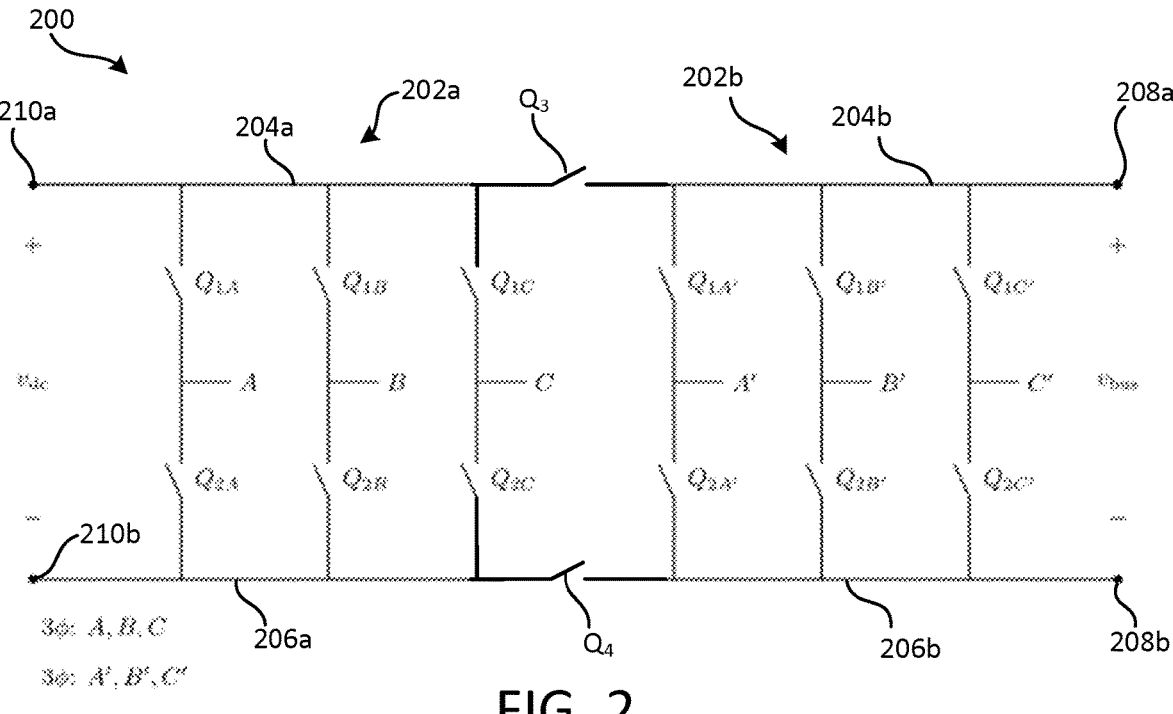
FIG. 2 shows a first example power electronic circuit for the tapped stator shown in FIG. 1.

FIG. 1 shows a first example tapped stator 100 configured in accordance with some aspects of the present disclosure, and FIG. 2 shows a first example power electronic circuit 200 that may be used to drive the tapped stator 100 shown in FIG. 1. As shown in FIG. 1, the tapped stator 100 may include first windings 102a, 102b, and 102c and second windings 104a, 104b, and 104c. In the illustrated example, taps A, B, and C are arranged to offer a full winding ABC that includes both the first windings 102a, 102b, 102c and the second windings 104a, 104b, and 104c, and taps A', B', and C' are arranged to offer a sub-winding A'B'C' that includes only the first windings 102a, 102b, and 102c. As can be seen, the sub-winding A'B'C' is similar to the full winding ABC but includes fewer turns between the respective pairs of taps. Although, in the illustrated example, the sub-winding A'B'C' and the full winding ABC are both three phase, it should be appreciated that quadrature and poly-phase windings may be employed in alternative implementations.

As shown in FIG. 2, the power electronic circuit 200 (which may be used to drive the tapped stator 100) may include two similar inverter bridges 202a and 202b, with the inverter bridge 202a being configured to drive the full winding ABC via the taps A, B, and C and the inverter bridge 202b being configured to drive the sub-winding A'B'C' via the taps A', B', and C'. As shown in FIG. 2, the inverter bridge 202a may include a high voltage rail 204a and a low voltage rail 206a and, similarly, the second inverter bridge 202b may include a high voltage rail 204b and a low voltage rail 206b. Terminals 208a and 208b may be connected to a high voltage output and a low voltage output (e.g., ground), respectively, of a direct current (DC) power supply (not illustrated), such as a DC-to-DC converter, a battery, etc., that outputs a DC voltage Vbus. Although most of the examples described herein relate to operation of both of the inverter bridges 202a, 202b to direct current from the voltage rails 204, 206 to the their associated windings 102, 104 so the windings generate magnetic flux that can interact with rotor magnets to produce torque for a motor, it should be appreciated that, in other implementations, one or both of the inverter bridges 202a, 202b may alternatively be controlled to direct current from its associated windings (e.g., generated in response to flux from rotor magnets linking with the windings) to its voltage rails, thus allowing the machine including the tapped stator 100 to behave, at least in part, as a generator.

As additionally shown in FIG. 2, the inverter bridge 202a may include (i) switches $Q_{1A}$ and $Q_{2A}$ arranged to selectively connect the terminal A to a high voltage rail 204a and a low voltage rail 206a, respectively, (ii) switches $Q_{1B}$ and $Q_{2B}$ arranged to selectively connect the terminal B to the high voltage rail 204a and the low voltage rail 206a, respectively, and (iii) switches $Q_{1C}$ and $Q_{2C}$ arranged to selectively connect the terminal C to the high voltage rail 204a and the low voltage rail 206a, respectively. Similarly, the inverter bridge 202b may include (i) switches $Q_{1A'}$ and $Q_{2A'}$ arranged to selectively connect the terminal A' to a high voltage rail 204b and a low voltage rail 206b, respectively, (ii) switches $Q_{1B'}$ and $Q_{2B'}$ arranged to selectively connect the terminal B' to the high voltage rail 204b and the low voltage rail 206b, respectively, and (iii) switches $Q_{1C'}$ and $Q_{2C'}$ arranged to selectively connect the terminal C' to the high voltage rail 204b and the low voltage rail 206b, respectively. As also shown in FIG. 2, power electronic circuit 200 may additionally include a first bus switch $Q_3$ arranged to selectively connect the high voltage rail 204a to the high voltage rail 204b and a second bus switch $Q_4$ arranged to selectively connect the low voltage rail 206a to the low voltage rail 206b.

Figure 3A:
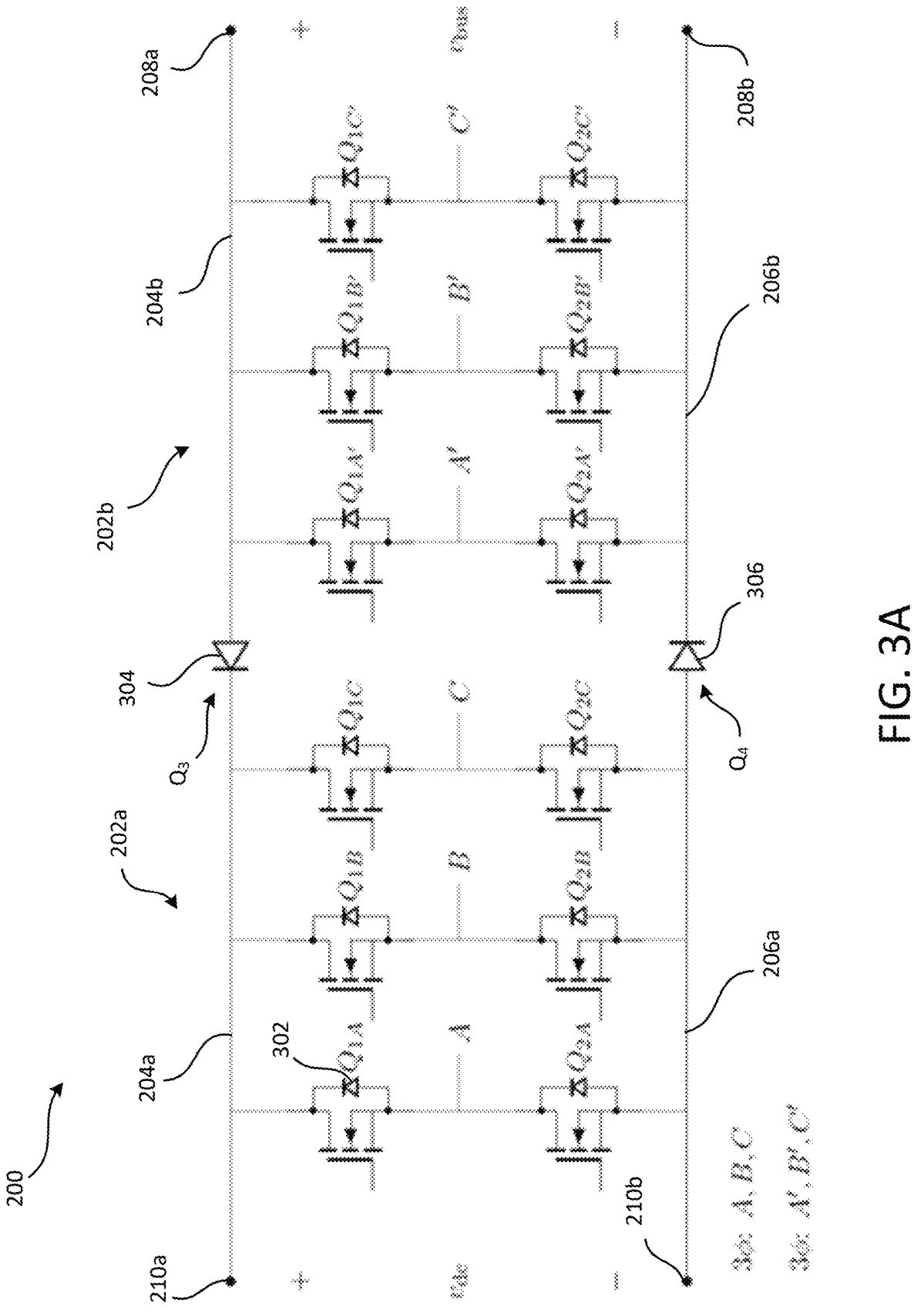
FIG. 3A shows a first example implementation of the power electronic circuit shown in FIG. 2.
Figure 3B:
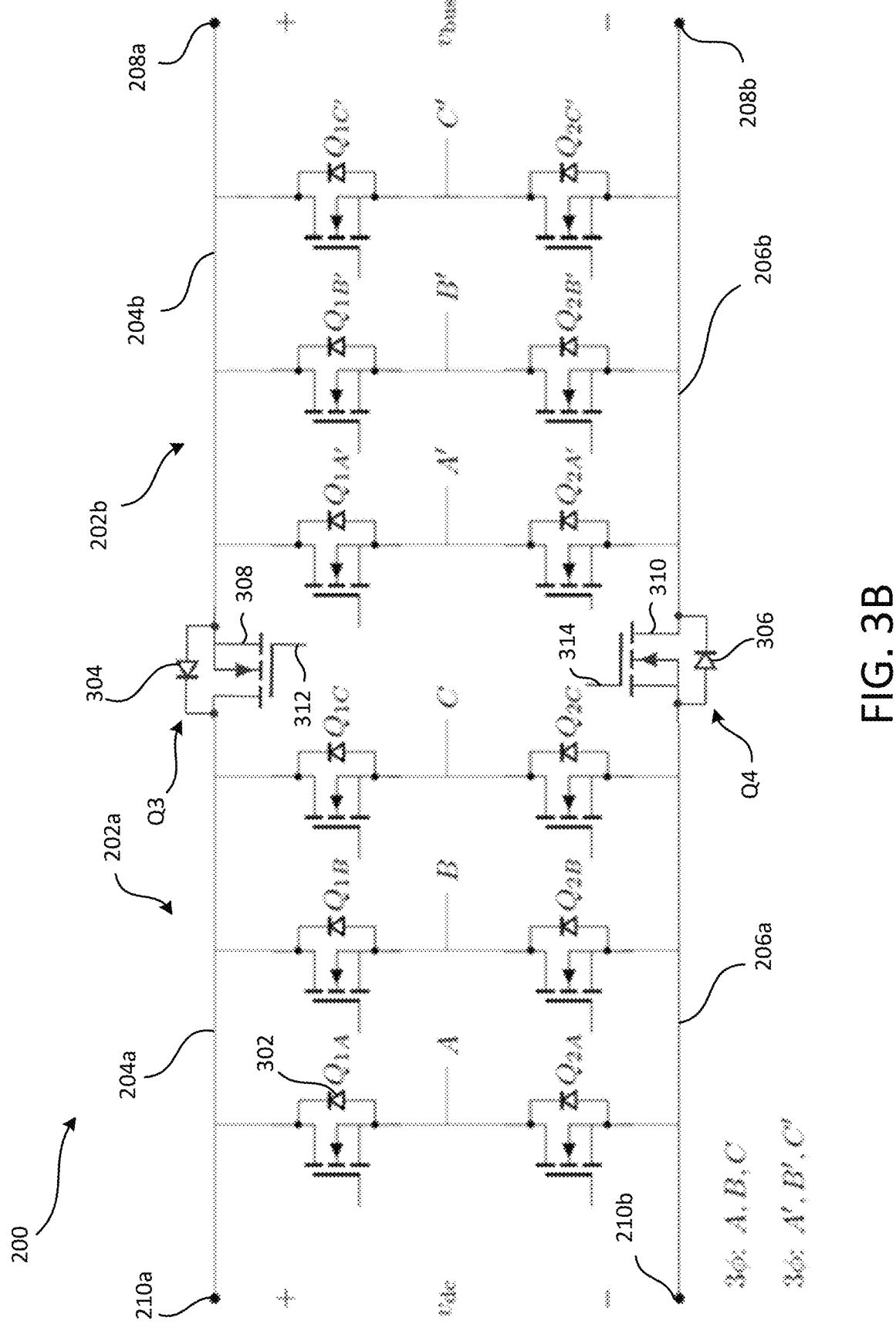
FIG. 3B shows a second example implementation of the power electronic circuit shown in FIG. 2.

FIGS. 3A and 3B show example arrangements of transistors, e.g., metal-oxide-semiconductor field-effect transistors (MOSFETs), that may be used to implement the various switches of the two inverter bridges 202a, 202b shown in FIG. 2. As illustrated, the transistors may each include a body diode 302, which, as explained in more detail below, is an inherent property of many types of transistors. As shown in FIG. 3A, in some implementations, the first bus switch Q₃ and the second bus switch Q₄ may be implemented using a diode 304 and a diode 306, respectively. Although conventional diodes could be used for this purpose, as shown in FIG. 3B, in some implementations, the diodes 304, 306 may be implemented using the body diodes of respective transistors (e.g., MOSFETs, IGBTs, etc.) 308, 310. In some such implementations, the transistors 308, 310 may be turned on, e.g., by applying voltages to their control terminals (e.g., gates or bases) 312, 314, during periods when the first inverter bridge 202a is to be used to drive the terminals A, B, C (e.g., during a lower speed, higher torque mode of operation), thus enhancing the current flow from the high voltage rail 204b to the high voltage rail 204a and from the low voltage rail 206a to the low voltage rail 206b during such periods.

Figure 4:
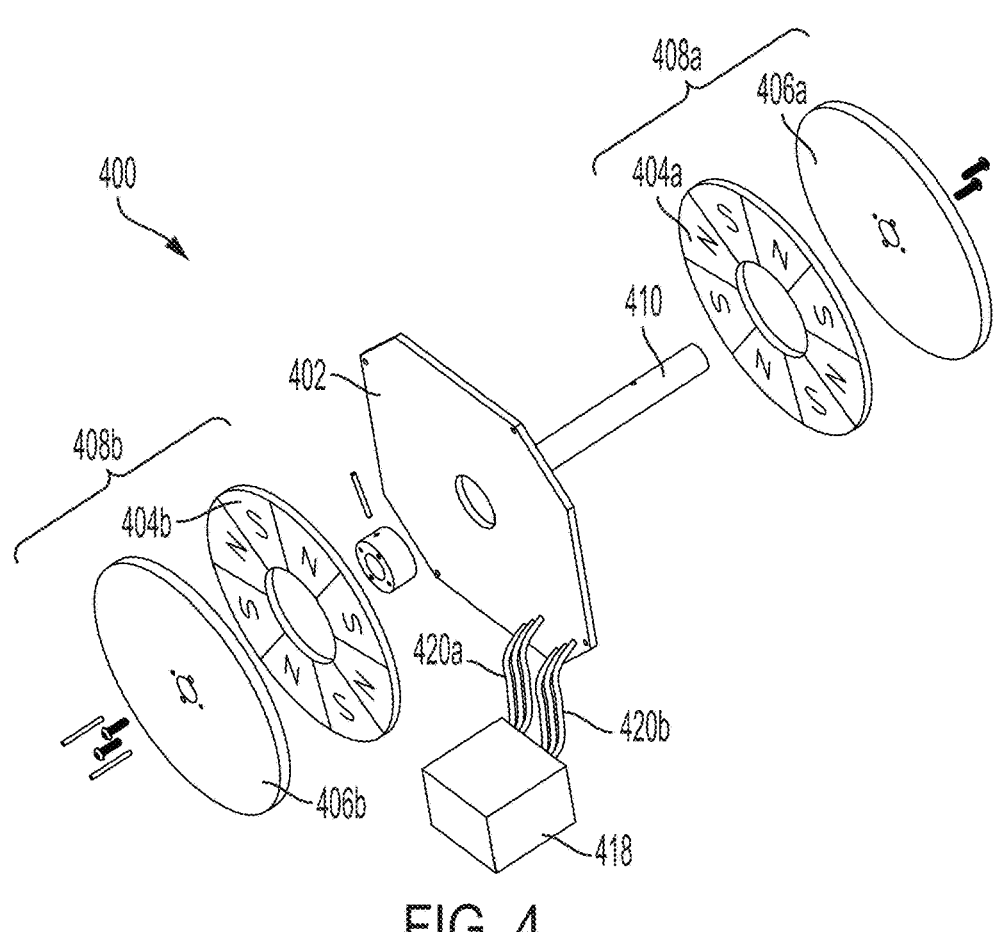
FIG. 4 shows an exploded view of internal components of an example axial flux machine with a PCB stator.
Figure 5:
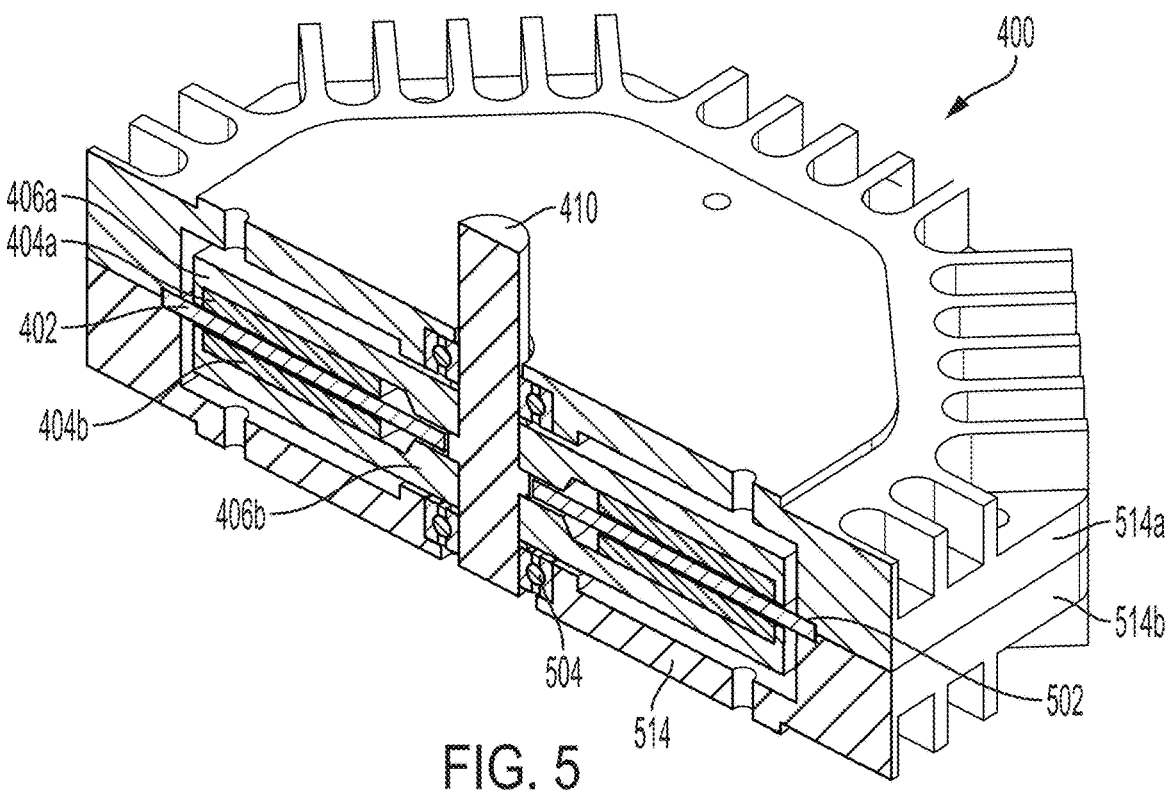
FIG. 5 shows a sectioned view of an axial flux machine including the components shown in FIG. 4.
Figure 6:
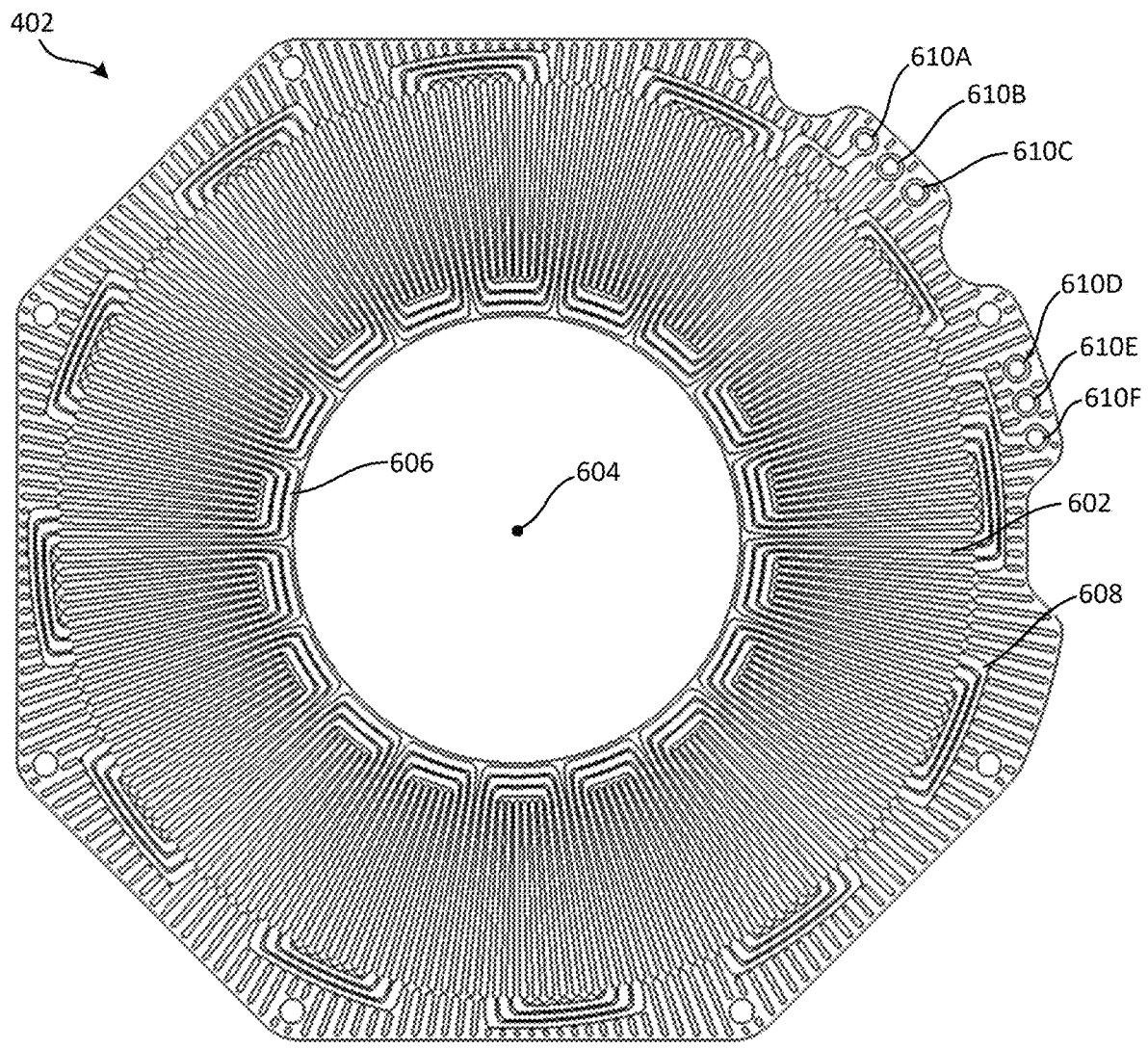
FIG. 6 shows a top view of a printed circuit board stator that may be employed in the axial flux machine shown in FIGS. 4 and 5 and which may embody the tapped stators described herein.

FIGS. 4 and 5 show exploded and sectioned views, respectively, of an example axial flux machine 400 in which the tapped stator 100 and associated power electronic circuit 200 described herein may be employed. As shown in these figures, a PCB stator 402 (which may correspond to the tapped stator 100 shown in FIG. 1) may be placed in the gap of a magnetic circuit established by components of a rotor. FIG. 6 shows a top view of an example planar stator 402 that may be employed in the machine 400. Other examples of similar axial flux machines are also described in the various patents incorporated by reference above.

As shown in FIGS. 4 and 5, the PCB stator 402 may be placed in the gap of a magnetic circuit established by components of a rotor. As shown best in FIG. 4, the rotor may include magnets 404a, 404b and support structures 406a, 406b that together form a pair of rotor assemblies 408a, 408b that may be attached to a shaft 410 of the rotor. As shown in FIG. 5, an outer edge 502 of the PCB stator 402 may be fixedly secured to a housing 514 (e.g., by being held between respective sections 514a, 514b of the housing 514), whereas the rotor shaft 410 (to which the rotor assemblies 408a, 408b are attached) may be rotatable relative to the housing 514 (e.g., via bearings 504).

In motor mode, a current density that rotates synchronously about the rotor's axis of rotation may be imposed on the PCB stator 402 by a controller 418 (shown in FIG. 4). The interaction of this current density with the magnetic flux in the gap from the rotor assemblies 408a, 408b leads to a torque of electromagnetic origin. The controller 418 may be operated such that the energy conversion effected by this structure is bidirectional, in the sense that the electric machine may absorb power from the mechanical terminals and deliver it to the electrical terminals, or it may deliver power to the mechanical terminals. Under appropriate control, a machine of this kind may simulate a variety of mechanical loads including components of friction, moment of inertia, and similar.

As shown in FIG. 6, the PCB stator 402 may include radial traces 602. The portion of the PCB stator 402 with such radial features, i.e., the annular region extending between a radial distance r1 (measured from a center point 604 of the PCB stator 402, which coincides with the axis of rotation of the rotor of the machine 400) and a radial distance r2 (also measured from the center point 604), is located within the "active" area of the machine 400, in the sense that it is primarily responsible for the production of torque in the machine 400. The inner and outer radii of the magnets 404 attached to the rotor of the machine 400 are typically positioned at or near the radial distance r1 (measured from stator's axis of rotation) and the radial distance r2 (also measured from the stator's axis of rotation), respectively, thus creating axially directed magnetic flux within the annular active area. The remaining features, e.g., inner end turns 606 and outer end turns 608 (which may be on different layers of the PCB stator 402) radially adjacent to the annular active area of the PCB stator 402, may exist only to connect the radial traces 602 in series and parallel combinations and convey the associated currents and voltages to terminals 610A, 610B, 610C, 610E, 610F, and 610G. of the PCB stator 402. The terminals 610A, 610B, and 610C maybe connected, for example, to taps A, B, and C, respectively, of the tapped stator 100 shown in FIG. 1, and the terminals 610C, 610E, 610F may be connected, for example, to outer taps A', B', and C' of the tapped stator 100 shown in FIG. 1.

As noted previously, in some implementations, the tapped stator 100 shown in FIG. 1 may be embodied within the PCB stator 402 shown in FIGS. 4-6, with conductive traces on one or more layers of the PCB stator 402 forming the first windings 102a, 102b, 102c and the second windings 104a, 104b, 104c shown in FIG. 1. Further, in some implementations, the power electronic circuit 200 that is used to drive the tapped stator 100 may be included within the controller 418 shown in FIG. 4, with three conductors 420a providing electrical connections between the power electronic circuit 200 and the terminals 610A, 610B, and 610C (e.g., to drive the taps A, B, and C) of the tapped stator 100 and three conductors 420b providing electrical connections between the power electronic circuit 200 and the terminals 610D, 610E, and 610F (e.g., to drive the taps A', B', and C') of the tapped stator 100.

In some implementations, the switches of a power electronic circuit 200 may be arranged to operate under dynamic and continuously variable control to drive a motor (e.g., the axial flux machine 400) including the tapped stator 100 in an optimal fashion, subject to certain constraints. Such constraints might include, for example, limits on current and voltage available to drive the motor over a range of speeds and torques.

For instance, the power electronic circuit 200 that is employed may operate in two different operational modes, with the first inverter bridge 202a being used to drive the outer taps A, B, C of the tapped stator 100 during a lower-speed, higher-torque operational mode and the second inverter bridge 202b being used to drive the taps A'B'C' during a higher-speed, lower-torque operational mode. In some implementations, one or more sensors (not shown) may be used to detect currently operating conditions of the axial flux machine 400 to allow the controller 418 to determine optimal times to switch between the two operational modes.

Figure 7:
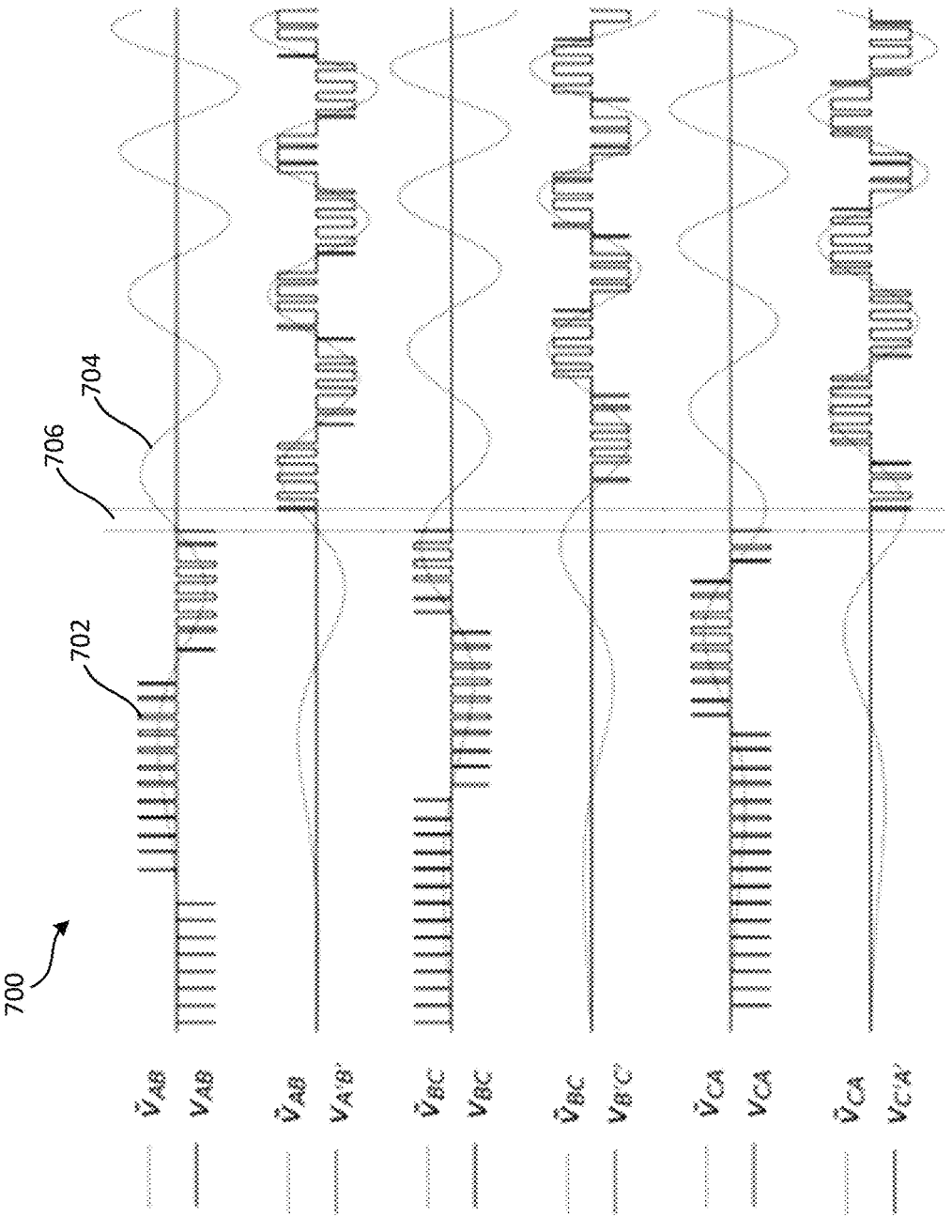
FIG. 7 shows example voltages that may be created by the inverter configuration shown in FIG. 2, in terms of the phase to phase voltages.

FIG. 7 is a waveform diagram 700 illustrating possible voltages that may be created by the power electronic circuit 200, in terms of the phase-to-phase voltages. In each of the waveforms shown in FIG. 6, the jagged traces 702 represent actual voltages that are applied between the indicated taps, and the smooth traces 704 represent the average voltage that is seen between those same taps. The vertical axis of the waveform diagram 700 corresponds to the amplitude of the indicated voltage and the horizontal axis corresponds to time. In the first and second (from the top) waveforms shown in FIG. 7, for example, the smooth traces 704 show how the average AB voltage (i.e., the average voltage between the between the outer tap A and the outer tap B of the tapped stator 100) may change as the motor speed increases. As can be seen, both the amplitude and frequency of the average AB voltage may increase as a function of time. In some implementations, the controller 418 may control the power electronic circuit 200 to cause it to automatically switch from driving the high-voltage taps (e.g., taps A, B, and C of the tapped stator 100), to the low-voltage taps (e.g., the taps A', B', C' of the tapped stator 100) as the voltage of the motor increases. The manner in which this decision is made may be a function of the optimality criteria and constraints of the controller 418, but the ability to effect the control action may be enabled by the switch topology of the power electronic circuit 200 and the physical configuration of the tapped stator 100.

Figure 8:
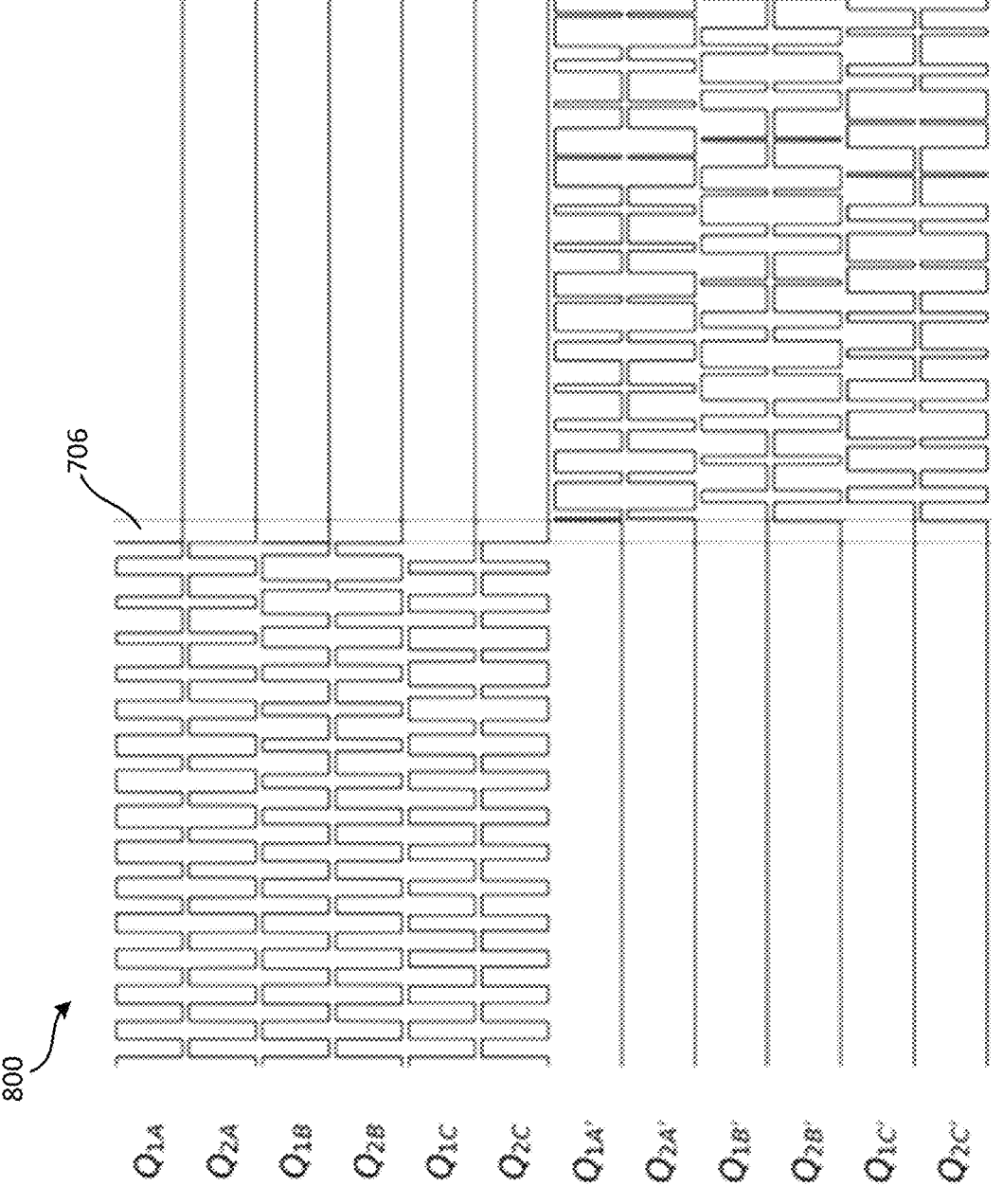
FIG. 8 shows example switch-control waveforms that may be used to create the waveforms shown in FIG. 7.

FIG. 8 is a waveform diagram 800 illustrating possible switch-control waveforms that may be employed to create the waveforms shown in FIG. 7. In particular, the waveforms shown in FIG. 8 may correspond to control signals that may be applied to respective ones of twelve switches of the inverter bridges 202a and 202b shown in FIG. 2, with the labels in FIG. 8 (e.g., Q1A, Q2A, etc.) indicating the correspondence between the illustrated control signal waveforms and the respective switches.

FIGS. 7 and 8 also illustrate a brief time interval 706 between when the inverter bridge 202a is operating (e.g., to drive the outer taps A, B and C) and when the inverter bridge 202b is operating (e.g., to drive the taps A', B' and C'). For reasons that will now be explained, in some implementations, during the time intervale 706, the bus switches Q3 and Q4 may be switched to or otherwise enter an open state, and may remain open while the second inverter bridge 202b is operational, to optimize operation of the axial flux machine 400.

The switches of the power electronic circuit 200 used to drive the tapped stator 100 may take on any of numerous forms and may be implemented using any of a number different types of devices, including, for example, power transistors, power metal-oxide-semiconductor field-effect transistors (MOSFETs), insulated-gate bipolar transistors (IGBTs), gallium nitride field-effect transistors (GaN FETs), and others. A characteristic of many of these devices is that they include a parasitic diode between their current terminals (e.g., source and drain, emitter and collector, etc.), which is commonly referred to as a "body diode." As such, even when either of the inverter bridges 202a, 202b is non-operational (i.e., when all of its switches remain open), the respective switches of that inverter bridge will behave as diodes (e.g., corresponding to the body diodes 302 shown in FIGS. 3A and 3B). The presence of body diodes 302 in the switches of the inverter bridge 202a does not present a problem for the axial flux machine 400, since, no matter the mode of operation, the voltage at the taps A', B' and C' will always be somewhere between the voltage on the high voltage rail 204b and the voltage on low voltage rail 206b (e.g., ground). For the inverter bridge 202b, however, the presence of body diodes 302 in its switches presents a significant problem. In particular, the inventors have recognized and appreciated that, absent the bus switches Q3 and Q4, at certain times when the second inverter bridge 202b is operational and the first inverter bridge 202a is not in use (e.g., during a higher-speed, lower-torque mode of operation of the axial flux machine 400), the voltage at the taps A, B, and C can become sufficient to "turn on" individual body diodes 302 of the first inverter bridge 202a and effectively short respective ones of the second windings 104.

Figure 9:
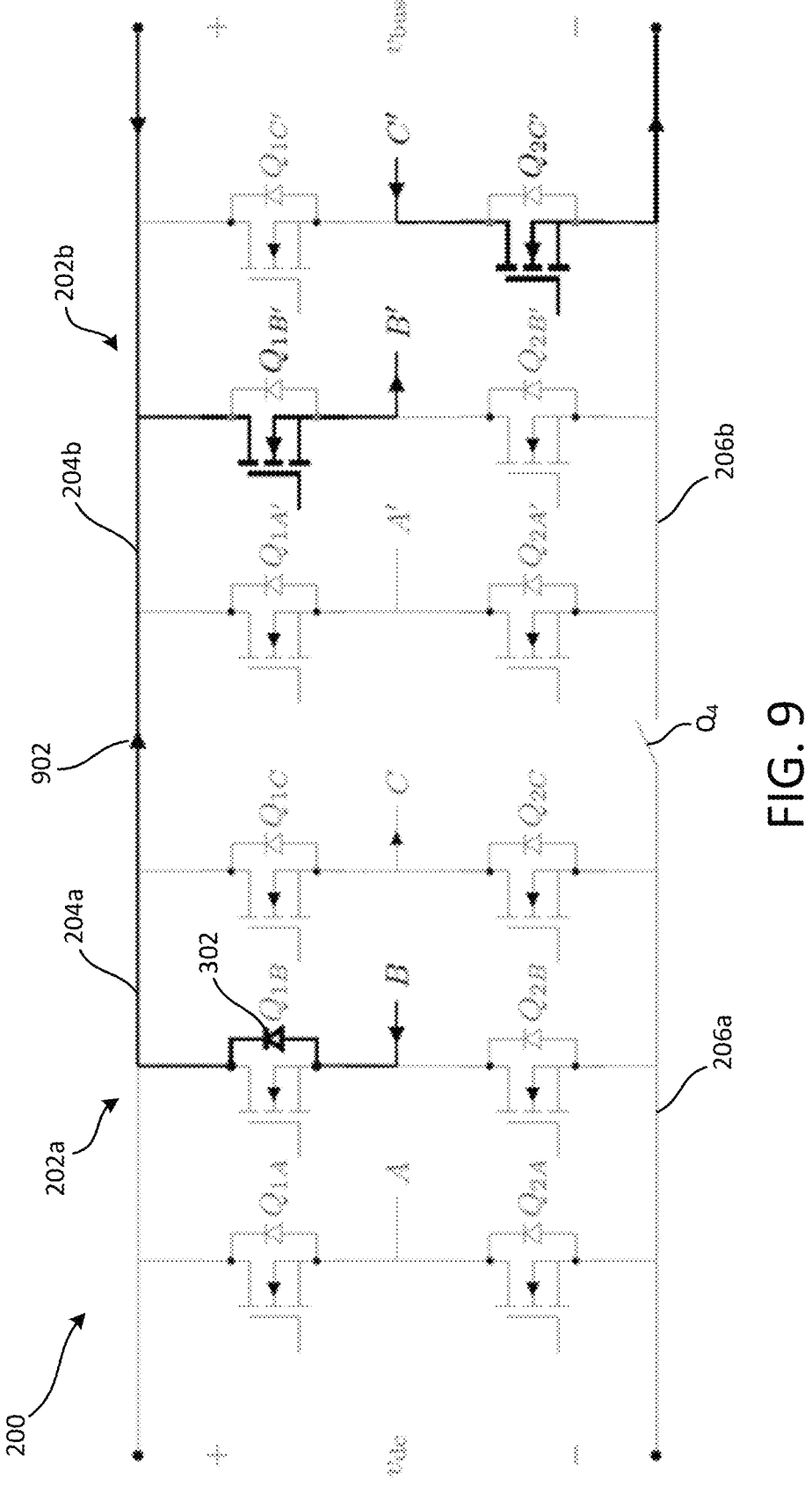
FIGS. 9 and 10 illustrate problems that may be encountered in the absence of the bus switches shown in FIG. 2.
Figure 10:
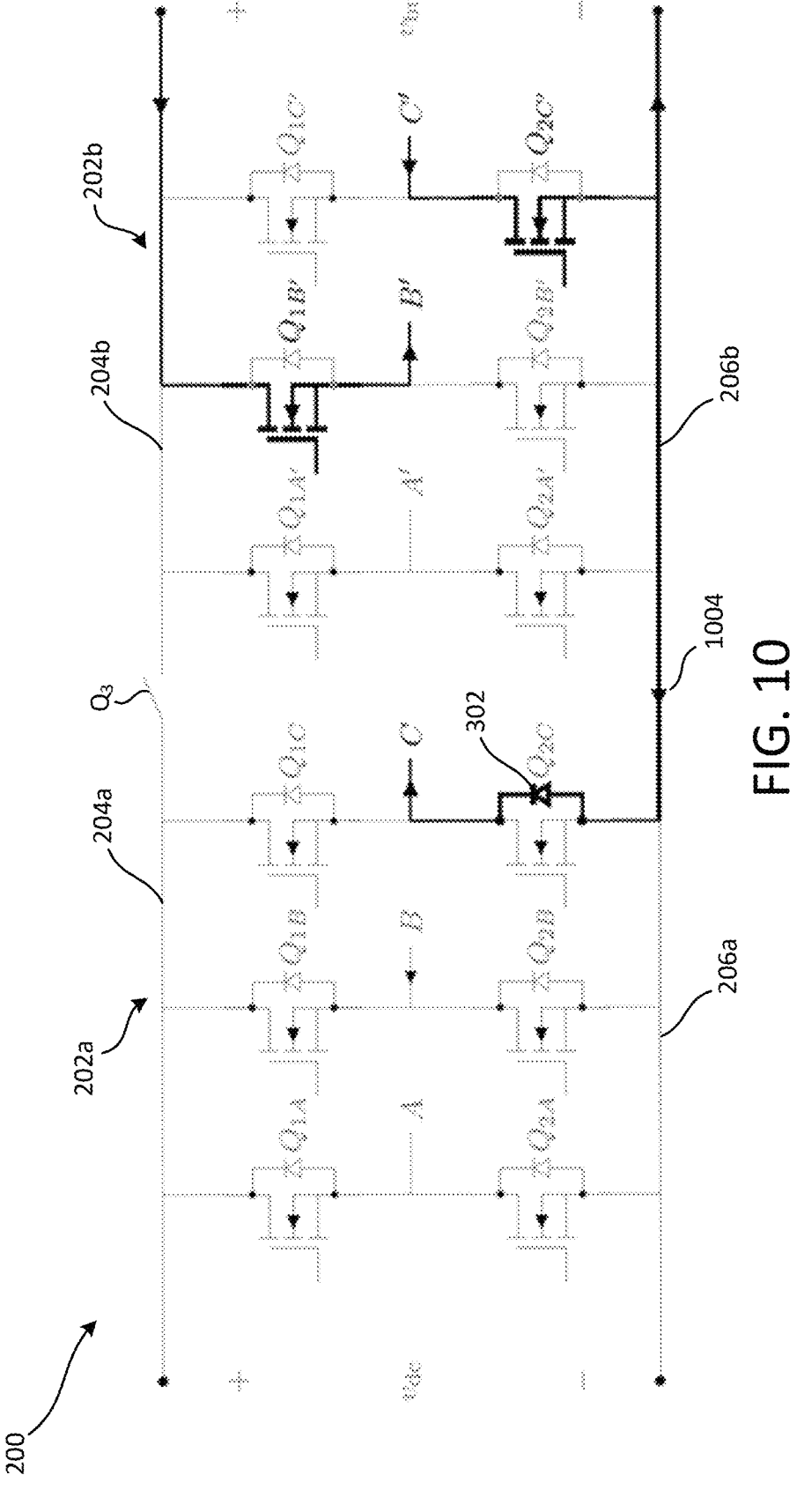

Two example circumstances in which individual second windings 104 of the tapped stator 100 would be shorted in such a fashion, but for the presence of the bus switches Q3 and Q4, are shown in FIGS. 9 and 10, with FIG. 9 illustrating an example circumstance that would occur if the bus switch Q3 were not employed and FIG. 10 illustrating an example circumstance that would occur if the bus switch Q4 were not employed. FIGS. 9 and 10 both illustrate points in time where the second inverter bridge 202b is being operated to drive the taps A', B' and C' (e.g., during a higher-speed, lower-torque mode of operation) and the first inverter bridge 202a is not in use, so that all of its switches remain open.

Referring first to FIG. 9, absent the bus switch Q3 between the high voltage rail 204a and the high voltage rail 204b, at a particular stage of the sequence of operation, the switches $Q_{1B'}$ and $Q_{2C'}$ are driven to the "on" condition and carry currents, as indicated by the bold paths in the second inverter bridge 202b. Even though the switch $Q_{1B}$ is not driven, e.g., by applying a voltage to its control terminal (e.g., gate or base), its body diode 302 is turned on in the illustrated circumstance (where the voltage at the tap B' is greater than the voltage at the tap C') because the voltage generated by the second winding 104b (which is connected between the tap B and the tap B'-see FIG. 1) causes the voltage between the tap B and the tap B' to exceed the turn on voltage of the body diode 302 of the switch $Q_{1B'}$. This provides a current flow path through the body diode 302 of the switch $Q_{1B}$ into the voltage rail 204a, which effectively shorts the second winding 104b and results in a torque opposing the motor action. This adverse effect can be avoided by placing a suitable device (e.g., the diode 304 shown in FIG. 3A or the transistor 308 shown in FIG. 3B) been the high voltage rail 204a and the high voltage rail 204b to oppose the current that would otherwise flow (as indicated by an arrow 902 in FIG. 9) between the first inverter bridge 202a and the second inverter bridge 202b in this circumstance.

FIG. 10 illustrates how a similar problem would occur, at the same stage of the sequence of operation as shown in FIG. 9, if the bus switch Q4 were not located between the low voltage rail 206b and the low voltage rail 206a. As noted above, at this particular stage in the sequence, the switches $Q_{1B'}$ and $Q_{2C'}$ are driven to the "on" condition and carry currents, as indicated by the bold paths in the second inverter bridge 202b. Even though the switch $Q_{2C}$ is not driven, e.g., by applying a voltage to its control terminal (e.g., gate or base), its body diode 302 is turned on in the illustrated circumstance (where the voltage at the tap B' is greater than the voltage at the tap C') because the voltage generated by the second winding 104c (which is connected between the tap C' and the tap C'—see FIG. 1) causes the voltage between the tap C' and the tap C to exceed the turn on voltage of the body diode 302 of the switch $Q_{2C}$. This provides a current flow path through the body diode 302 of the switch $Q_{2C}$ from the low voltage rail 206a, which effectively shorts the second winding 104c and results in a torque opposing the motor action. This adverse effect can be avoided by placing a suitable device (e.g., the diode 306 shown in FIG. 3A or the transistor 310 shown in FIG. 3B) been the low voltage rail 206b and the low voltage rail 206a to oppose the current that would otherwise flow (as indicated by an arrow 1004 in FIG. 10) between the second inverter bridge 202b and the first inverter bridge 202a in this circumstance.

From consideration of these two cases, it should be appreciated that additional combinations of driven switches in the second inverter bridge 202b and a body diode 302 of a switch in the first inverter bridge 202a would present identical problems at different stages in the sequence of operation, and that the inclusion of the bus switches Q3 and Q4 would likewise ameliorate all such problems.

Figure 11:
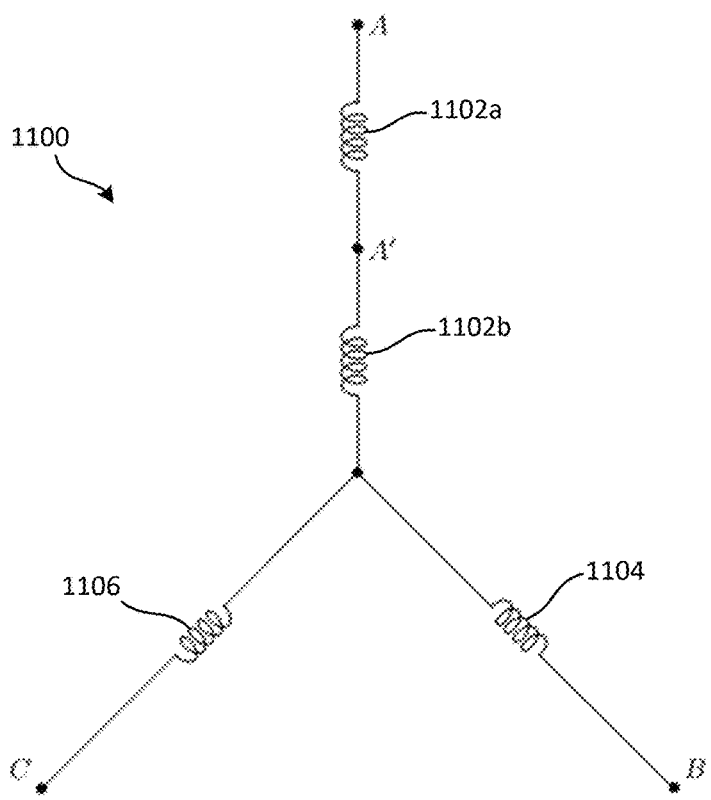
FIG. 11 shows a second example tapped stator having a wye configuration and a single tapped phase.
Figure 12:
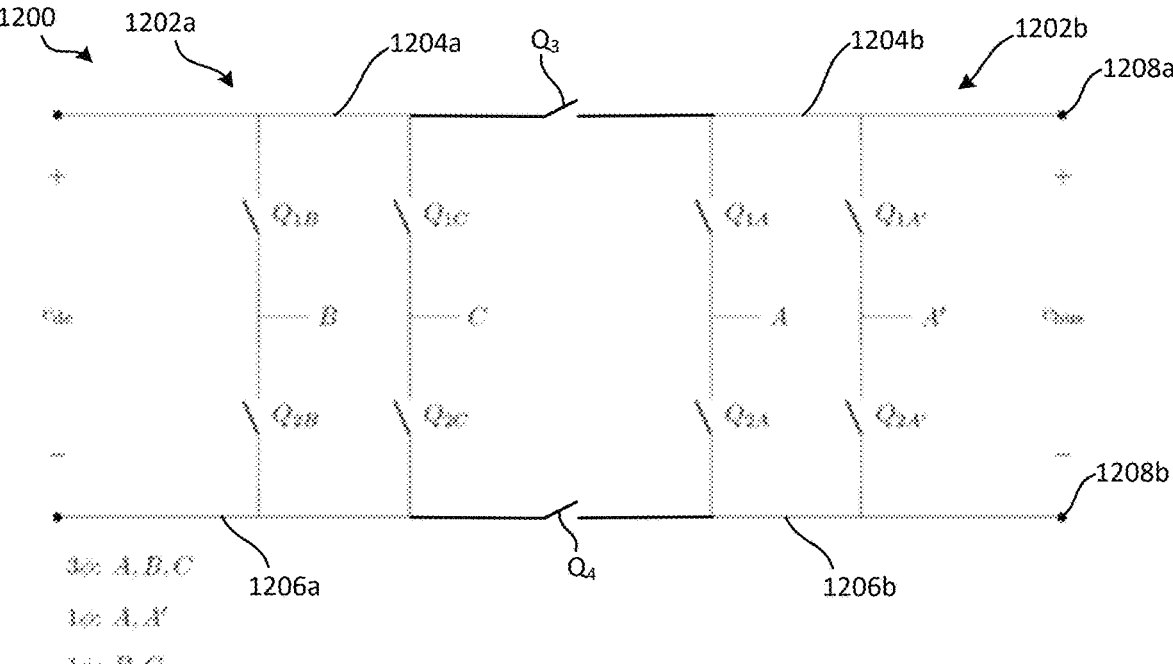
FIG. 12 shows an example power electronic circuit for the tapped stator shown in FIG. 11.

FIGS. 11 and 12 show, respectively, a second example tapped stator 1100 configured in accordance with some aspects of the present disclosure, and a second example power electronic circuit 1200 that may be used to drive the tapped stator 1100.

As shown in FIG. 11, the tapped stator 1100 may include windings 1102, 1104, and 1106 associated with respective phases, with one of the windings (the winding for phase A in the illustrated example) including two sub-windings 1102a and 1102b with a tap A' between them. Similar to the tapped stator 100 shown in FIG. 1, the taps A, B, and C may be arranged to offer a full winding ABC (including the entirety of all three windings 1102, 1104 and 1106) that can be driven during a first operational mode (e.g., a slower-speed, higher torque operational mode), and can also offer a sub-winding AA'(including only sub-winding 1102a) that can be driven during a second operational mode (e.g., a higher-speed, lower torque operational mode).

Also similar to the tapped stator 100 (described above), in some implementations, the tapped stator 1110 may be embodied within the PCB stator 402 shown in FIGS. 4-6, with conductive traces on one or more layers of the PCB stator 402 forming the windings 1102, 1104, and 1106 shown in FIG. 11. Further, in some implementations, the power electronic circuit 1200 that is used to drive the tapped stator 1100 may be included within the controller 418 shown in FIG. 4, with three conductors 420a providing electrical connections between the power electronic circuit 1200 and the taps A, B, and C of the tapped stator 1100 and another conductor 420b providing an electrical connection between the power electronic circuit 1200 and the tap A' of the tapped stator 1100.

As shown in FIG. 12, the power electronic circuit 1200 (which may be used to drive the tapped stator 1100) may include two similar inverter bridges 1202a and 1202b. In particular, the inverter bridge 1202a may include (i) switches $Q_{1B}$ and $Q_{2B}$ arranged to selectively connect the tap B to a high voltage rail 1204a and a low voltage rail 1206a, respectively, and (ii) switches $Q_{1C}$ and $Q_{2C}$ arranged to selectively connect the tap C to the high voltage rail 1204a and the low voltage rail 1206a, respectively. Similarly, the inverter bridge 1202b may include (i) switches $Q_{1A}$ and $Q_{2A}$ arranged to selectively connect the tap A to a high voltage rail 1204b and a low voltage rail 1206b, respectively, and (ii) switches $Q_{1A'}$ and $Q_{2A'}$ arranged to selectively connect the tap A' to the high voltage rail 1204b and the low voltage rail 1206b, respectively. As explained in more detail below, in some implementations, all four switches of the inverter bridge 1202a and two of the switches (i.e., switches Q1A and Q2A) of the inverter bridge 1202b may be controlled to drive the full winding ABC via the taps A, B, and C, and the other two switches of the inverter bridge 1202b (i.e., switches $Q_{1A'}$ and $Q_{2A'}$) may be controlled to drive the sub-winding AA' via the taps A and A'.

Advantageously, as also shown in FIG. 12, the power electronic circuit 1200 may additionally include a first bus switch $Q_3$ arranged to selectively disconnect the high voltage rail 1204a from the high voltage rail 1204b and a second bus switch Q4 arranged to selectively disconnect the low voltage rail 1206a from the low voltage rail 1206b. Similar to the bus switches Q3 and Q4 described above in connection with the power electronic circuit 200, the bus switches Q3 and Q4 of the power electronic circuit 1200 may serve to prevent the body diodes of the switches of the inverter bridge 1202a from becoming conductive during periods when inverter bridge 1202a is not being used to drive the taps A, B, and C (e.g., during a mode operation in which the inverter bridge 1202b is being used to drive the taps A and A' during a higher-speed, lower torque mode of operation).

In some implementations, terminals 1208a and 1208b of the power electronic circuit 1200 may be connected to a high voltage output and a low voltage output (e.g., ground), respectively, of a direct current (DC) power supply (not illustrated), such as a DC-to-DC converter, a battery, etc., that outputs a DC voltage $V_{bus}$. Although most of the examples described herein relate to operation of both of the inverter bridges 1202a, 1202b to direct current from the voltage rails 1204, 1206 to the their associated windings 1102, 1104, 1106 so the windings generate magnetic flux that can interact with rotor magnets to produce torque for a motor, it should be appreciated that, in other implementations, one or both of the inverter bridges 1202a, 1202b may alternatively be controlled to direct current from its associated windings (e.g., generated in response to flux from rotor magnets linking with the windings) to its voltage rails, thus allowing the machine including the tapped stator 1100 to behave, at least in part, as a generator.

Similar to the tapped stator 100 (shown in FIG. 1), one mode of operation of the tapped stator 1100 may be a conventional configuration in which switches $Q_{1A}$, $Q_{1B}$, $Q_{1B}$, $Q_{2B}$, $Q_{1C}$, and $Q_{2C}$ are controlled drive the full winding ABC by applying a three-phase signal to the taps A, B, and C. In some implementations, a second mode of operation may involve controlling the switches $Q_{1A}$, $Q_{2A}$, $Q_{1A'}$ and $Q_{2A'}$ to apply a single phase signal between the taps A and A'. During such second mode, the bus switches Q3 and Q4 of the power electronic circuit 1200 may operate to prevent the flow of current the high voltage rail 1204b to the high voltage rail 1204a or from the low voltage rail 1206a to the low voltage rail 1206b, for reasons similar to those outlined above. In some implementations, it may be necessary to impose certain constraints on how the controller 418 operates the axial flux machine 400 as a motor. For example, the controller 418 may be prevented from starting the motor in a particular direction without first using the full winding ABC. This is not limiting, however, because the full winding ABC is the winding that is most suited for low-speed operation. In high-speed operation, the controller 418 may drive the sub-winding AA' to contribute torque. For some applications, this may be attractive due to the savings that might be achieved on the controller side, e.g., by reducing the number of switches employed by the power electronic circuit 1200 (shown in FIG. 12) as compared to the power electronic circuit 200 (shown in FIG. 2).

Figure 13:
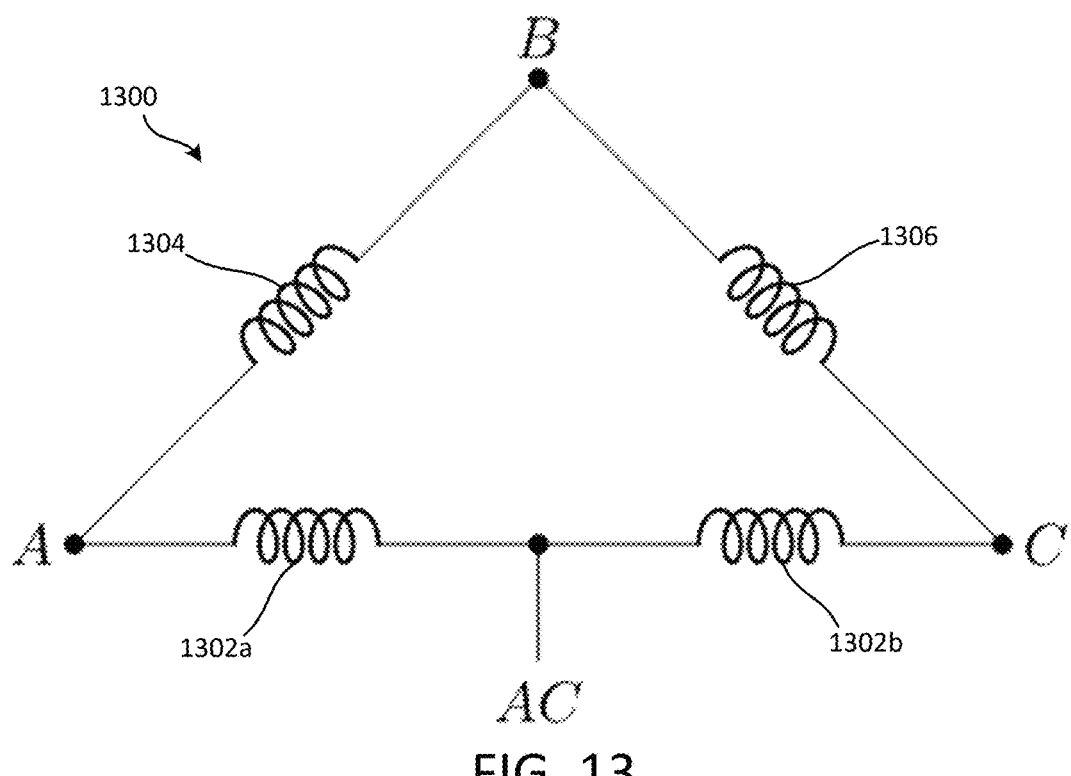
FIG. 13 shows a third example tapped stator having a delta configuration and a single tapped phase.
Figure 14:
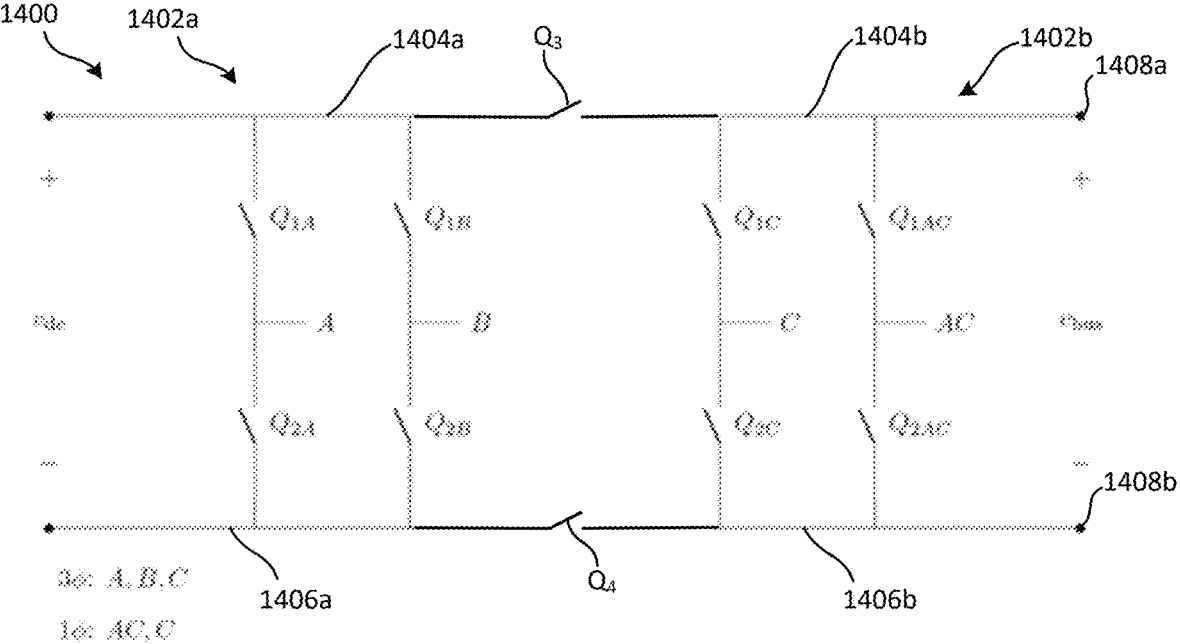
FIG. 14 shows an example power electronic circuit for the tapped stator shown in FIG. 13.

FIGS. 13 and 14 show, respectively, a third example tapped stator 1300 configured in accordance with some aspects of the present disclosure, and a third example power electronic circuit 1400 that may be used to drive the tapped stator 1300. As shown, the tapped stator 1300 and associated power electronic circuit 1400 (shown in FIGS. 13 and 14, respectively) may be similar to the tapped stator 1100 and associated power electronic circuit 1200 (shown in FIG. 11 and FIG. 12, respectively), but may employ a delta-connected winding configuration rather than a wye-connected winding configuration. Consideration of the tapped stator 1300 and associated power electronic circuit 1400 relative to standard motor windings and connection options is interesting. Many PCB stator windings have a wye-connected winding configuration similar to the tapped stator 100 (shown in FIG. 1) and the tapped stator 1100 (shown in FIG.

1), i.e., with a neutral point connection in the stator. Conventional machines, with wound stators, typically bring both ends of each individual phase winding out from the stator, because it is inconvenient to make connections between wires internal to the stator. These connections may be established in a junction box, on an auxiliary circuit board, or similar.

As shown in FIG. 13, the tapped stator 1300 may include windings 1302, 1304, and 1306 connected between respective pairs of taps A, B, and C, with one of the windings (the winding between taps A and C in the illustrated example) including two sub-windings 1302a and 1302b with a tap AC between them. Similar to the tapped stator 1100 shown in FIG. 11, the taps A, B, and C may be arranged to offer a full winding ABC (including the entirety of all three windings 1302, 1304 and 1306) that can be driven during a first operational mode (e.g., a slower-speed, higher torque operational mode), and can also offer a sub-winding AC-C (including only sub-winding 1302b) that can be driven during a second operational mode (e.g., a higher-speed, lower torque operational mode).

Like the other examples described above, in some implementations, the tapped stator 1300 may be embodied within the PCB stator 402 shown in FIGS. 4-6, with conductive traces on one or more layers of the PCB stator 402 forming the windings 1302, 1304, and 1306 shown in FIG. 11. Further, in some implementations, the power electronic circuit 1400 that is used to drive the tapped stator 1300 may be included within the controller 418 shown in FIG. 4, with three conductors 420a providing electrical connections between the power electronic circuit 1400 and the taps A, B, and C of the tapped stator 1300 and another conductor 420b providing an electrical connection between the power electronic circuit 1400 and the tap AC of the tapped stator 1300.

As shown in FIG. 14, the power electronic circuit 1400 (which may be used to drive the tapped stator 1300) may include two similar inverter bridges 1402a and 1402b. In particular, the inverter bridge 1402a may include (i) switches $Q_{1A}$ and $Q_{2A}$ arranged to selectively connect the tap A to a high voltage rail 1404a and a low voltage rail 1406a, respectively, and (ii) switches $Q_{1B}$ and $Q_{2B}$ arranged to selectively connect the tap B to the high voltage rail 1404a and the low voltage rail 1406a, respectively. Similarly, the inverter bridge 1402b may include (i) switches $Q_{1C}$ and $Q_{2C}$ arranged to selectively connect the tap C to a high voltage rail 1404b and a low voltage rail 1406b, respectively, and (ii) switches $Q_{1AC}$ and $Q_{2AC}$ arranged to selectively connect the tap AC to the high voltage rail 1404b and the low voltage rail 1406b, respectively. As explained in more detail below, in some implementations, all four switches of the inverter bridge 1402a and two of the switches (i.e., switches $Q_{1C}$ and $Q_{2C}$) of the inverter bridge 1402b may be controlled to drive the full winding ABC via the taps A, B, and C, and the other two switches of the inverter bridge 1202b (i.e., switches $Q_{1C}$ and $Q_{2AC}$) may be controlled to drive the sub-winding AC-C via the taps AC and A.

Advantageously, as also shown in FIG. 14, the power electronic circuit 1400 may additionally include a first bus switch $Q_3$ arranged to selectively disconnect the high voltage rail 1404a from the high voltage rail 1404b and a second bus switch $Q_4$ arranged to selectively disconnect the low voltage rail 1406a from the low voltage rail 1406b. Similar to the other bus switches described above, the bus switches Q3 and Q4 of the power electronic circuit 1400 may serve to prevent the body diodes of the switches of the inverter bridge 1402a from becoming conductive during periods when inverter bridge 1402a is not being used to drive the taps A, B, and C (e.g., during a mode operation in which the inverter bridge 1402b is being used to drive the taps A and AC during a higher-speed, lower torque mode of operation).

In some implementations, terminals 1408a and 1408b of the power electronic circuit 1400 may be connected to a high voltage output and a low voltage output (e.g., ground), respectively, of a direct current (DC) power supply (not illustrated), such as a DC-to-DC converter, a battery, etc., that outputs a DC voltage Vbus. Although most of the examples described herein relate to operation of both of the inverter bridges 1402a, 1402b to direct current from the voltage rails 1404, 1406 to the their associated windings 1302, 1304, 1306 so the windings generate magnetic flux that can interact with rotor magnets to produce torque for a motor, it should be appreciated that, in other implementations, one or both of the inverter bridges 1402a, 1402b may alternatively be controlled to direct current from its associated windings (e.g., generated in response to flux from rotor magnets linking with the windings) to its voltage rails, thus allowing the machine including the tapped stator 1300 to behave, at least in part, as a generator.

Similar to the tapped stator 1100 (shown in FIG. 11), one mode of operation of the tapped stator 1300 may be a conventional configuration in which switches $Q_{1A}$, $Q_{1B}$, $Q_{1B}$, $Q_{2B}$, $Q_{1C}$, and $Q_{2C}$ are controlled drive the full winding ABC by applying a three-phase signal to the taps A, B, and C. In some implementations, a second mode of operation may involve controlling the switches $Q_{1C}$, $Q_{2C}$, $Q_{1AC}$, and $Q_{2AC}$ to apply a single phase signal between the taps A and AC. During such second mode, the bus switches Q3 and Q4 of the power electronic circuit 1400 may operate to prevent the flow of current the high voltage rail 1404b to the high voltage rail 1404a or from the low voltage rail 1406a to the low voltage rail 1406b, for reasons similar to those outlined above. In some implementations, it may be necessary to impose certain constraints on how the controller 418 operates the axial flux machine 400 as a motor. For example, the controller 418 may be prevented from starting the motor in a particular direction without first using the full winding ABC. This is not limiting, however, because the full winding ABC is the winding that is most suited for low-speed operation. In high-speed operation, the controller 418 may drive the sub-winding AC-C to contribute torque. For some applications, this may be attractive due to the savings that might be achieved on the controller side, e.g., by reducing the number of switches employed by the power electronic circuit 1400 (shown in FIG. 14) as compared to the power electronic circuit 200 (shown in FIG. 2).

The following clauses describe example implementations of the present disclosure.

Clause 1. A rotary energy conversion device, comprising: an armature including at least a first winding segment and a second winding segment that are each configured to generate magnetic flux when energized, the second winding segment being connected in series with the first winding segment; a first inverter circuit configured to energize both the first winding segment and the second winding segment during a first mode of operation of the rotary energy conversion device; a second inverter circuit configured to energize the second winding segment but not the first winding segment during a second mode of operation of the rotary energy conversion device; and at least one switch configured and arranged to decouple of the first inverter circuit from the second inverter circuit during the second mode of operation.

Clause 2. The rotary energy conversion device of clause 1, wherein: the first inverter circuit includes a first switch configured to selectively allow current to flow from a first voltage rail to a first tap for the first winding segment during the first mode of operation; the second inverter circuit includes a second switch configured to selectively allow current to flow from a second voltage rail to a second tap for the second winding segment during the second mode of operation, wherein the second voltage rail is configured to be connected to a first terminal of a voltage source; and the at least one switch includes a third switch configured to allow current originating from the voltage source to flow from the second voltage rail to the first voltage rail during the first mode of operation, but to prohibit flow of current from the second voltage rail to the first voltage rail during the second mode of operation.

Clause 3. The rotary energy conversion device of clause 1 or clause 2, wherein: the first inverter circuit further includes a fourth switch configured to selectively allow current to flow from the first tap to a third voltage rail during the first mode of operation; the second inverter circuit further includes a fifth switch configured to selectively allow current to flow from the second tap to a fourth voltage rail during the second mode of operation, wherein the fourth voltage rail is configured to be connected to a second terminal of the voltage source; and the at least one switch further includes a sixth switch configured to allow current to flow from the third voltage rail to the fourth voltage rail during the first mode of operation, but to prohibit flow of current from the fourth voltage rail to the third voltage rail during the second mode of operation.

Clause 4. The rotary energy conversion device of clause 3, wherein: the third switch includes a first diode including a first anode and a first cathode, the first anode being connected to the second voltage rail and the first cathode being connected to the first voltage rail; and the sixth switch includes a second diode including a second anode and a second cathode, the second anode being connected to the third voltage rail and the second cathode being connected to the fourth voltage rail.

Clause 5. The rotary energy conversion device of clause 4, wherein: the first diode is a first body diode of a first transistor including a first current terminal, a second current terminal, and a first control terminal, the first current terminal being connected to the second voltage rail, the second current terminal being connected to the first voltage rail, and the first control terminal being configured and arranged to be driven to allow current flow from the first current terminal to the second current terminal during the first mode of operation; and the second diode is a second body diode of a second transistor including a third current terminal, a fourth current terminal, and a second control terminal, the third current terminal being connected to the third voltage rail, the fourth current terminal being connected to the fourth voltage rail, and the second control terminal being configured and arranged to be driven to allow current flow from the third current terminal to the fourth current terminal during the first mode of operation.

Clause 6. The rotary energy conversion device of any of clauses 1-5, further comprising a controller coupled to the first inverter circuit and the second inverter circuit, the controller being configured to: control first switches of the first inverter circuit to energize both the first winding segment and the second winding segment during the first mode of operation; and control second switches of the second inverter circuit to energize the second winding segment but not the first winding segment during the second mode of operation.

Clause 7. The rotary energy conversion device of clause 6, wherein the controller is configured to: control the at least one switch to couple the first inverter circuit to the second inverter circuit during the first mode of operation and to decouple the first inverter circuit from the second inverter circuit during the second mode of operation.

Clause 8. The rotary energy conversion device of any of clauses 1-7, further comprising: a rotor including one or more permanent magnets configured and arranged to generate first magnetic flux within an active region of the rotary energy conversion device; wherein: the armature is included in a stator of the rotary energy conversion device; the first winding segment and the second winding segment are configured and arranged to generate second magnetic flux within the active region when the first winding segment and the second winding segment are both energized by the first inverter circuit during the first mode of operation; and the first winding segment is configured and arranged to generate third magnetic flux within the active region when the first winding segment is energized by the second inverter circuit during the second mode of operation.

Clause 9. The rotary energy conversion device of clause 8, wherein: the one or more permanent magnets are configured and arranged to generate the first magnetic flux generally parallel to an axis of rotation of the rotor; the first winding segment and the second winding segment are configured and arranged to generate the second magnetic flux generally parallel to the axis of rotation when the first winding segment and the second winding segment are both energized by the first inverter circuit during the first mode of operation; and the first winding segment is configured and arranged to generate the third magnetic flux generally parallel to the axis of rotation when the first winding segment is energized by the second inverter circuit during the second mode of operation.

Clause 10. The rotary energy conversion device of clause 9, wherein the stator comprises a printed circuit board including conductive traces forming the first winding segment and the second winding segment.

Clause 11. The rotary energy conversion device of any of clauses 1-10, wherein the armature comprises a printed circuit board including conductive traces forming the first winding segment and the second winding segment.

Clause 12. The rotary energy conversion device of any of clauses 1-11, wherein: the armature has a wye configuration in which windings for three phases of the armature are connected at a common point; the first winding segment and the second winding segment are associated with a first phase of the three phases; and an end of the second winding segment is connected to the common point.

Clause 13. The rotary energy conversion device of clause 12, wherein: the armature further includes a third winding segment and a fourth winding segment associated with a second phase of the armature, and a fifth winding segment and a sixth winding segment associated with a third phase of the armature, the third winding segment being connected in series with the fourth winding segment, the fifth winding segment being connected in series with the sixth winding segment, and ends of the fourth winding segment and the sixth winding segment being connected to the common point; the first inverter circuit is further configured to energize the third winding segment, the fourth winding segment, the fifth winding segment, and the sixth winding segment during the first mode of operation; and the second inverter circuit is further configured to energize the fourth winding segment and the sixth winding segment, but not the third winding segment or the fifth winding segment during the second mode of operation.

Clause 14. The rotary energy conversion device of any of clauses 1-11, wherein: the armature has a delta configuration in which one or more first windings for a first phase are connected between a first tap and a second tap, one or more second windings for a second phase are connected between the second tap and a third tap, and one or more third windings for a third phase are connected between the third tap and the first tap; the first winding segment and the second winding segment are included in the one or more first windings; and the first inverter circuit is further configured to energize the one or more second windings and the one or more third windings during the first mode of operation.

Clause 15. A method for operating a rotary energy conversion device comprising an armature including at least a first winding segment and a second winding segment that are each configured to generate magnetic flux when energized, the second winding segment being connected in series with the first winding segment, the method comprising: operating a first inverter circuit to energize both the first winding segment and the second winding segment during a first mode of operation of the rotary energy conversion device; operating a second inverter circuit to energize the second winding segment but not the first winding segment during a second mode of operation of the rotary energy conversion device; and using at least one switch to decouple the first inverter circuit from the second inverter circuit during the second mode of operation.

Clause 16. The method of clause 15, wherein: operating the first inverter circuit includes controlling a first switch to selectively allow current to flow from a first voltage rail to a first tap for the first winding segment during the first mode of operation; operating the second inverter circuit includes controlling a second switch to selectively allow current to flow from a second voltage rail to a second tap for the second winding segment during the second mode of operation, wherein second voltage rail is connected to a first terminal of a voltage source; and using the at least one switch to decouple the first inverter circuit from the second inverter circuit includes using a third switch to: allow current origi-nating from the voltage source to flow from the second voltage rail to the first voltage rail during the first mode of operation, and prohibit flow of current from the second voltage rail to the first voltage rail during the second mode of operation.

Clause 17. The method of clause 15 or clause 16, wherein: operating the first inverter circuit further includes using a fourth switch to selectively allow current to flow from the first tap to a third voltage rail during the first mode of operation; operating the second inverter circuit further includes using a fifth switch to selectively allow current to flow from the second tap to a fourth voltage rail during the second mode of operation, wherein the fourth voltage rail is connected to a second terminal of the voltage source; and using the at least one switch to decouple the first inverter circuit from the second inverter circuit further includes using a sixth switch to: allow current to flow from the third voltage rail to the fourth voltage rail during the first mode of operation, and prohibit flow of current from the fourth voltage rail to the third voltage rail during the second mode of operation.

Clause 18. The method of clause 17, wherein: the third switch includes a first diode including a first anode and a first cathode, the first anode being connected to the second voltage rail and the first cathode being connected to the first voltage rail; and the sixth switch includes a second diode including a second anode and a second cathode, the second anode being connected to the third voltage rail and the second cathode being connected to the fourth voltage rail.

Clause 19. The method of clause 18, wherein: the first diode is a first body diode of a first transistor including a first current terminal, a second current terminal, and a first control terminal, the first current terminal being connected to the second voltage rail, and the second current terminal being connected to the first voltage rail; the second diode is a second body diode of a second transistor including a third current terminal, a fourth current terminal, and a second control terminal, the third current terminal being connected to the third voltage rail, the fourth current terminal being connected to the fourth voltage rail; and the method further comprises: driving the first control terminal to allow current to flow from the first current terminal to the second current terminal during the first mode of operation; and driving the second control terminal to allow current to flow from the third current terminal to the fourth current terminal during the first mode of operation.

Clause 20. The method of any of clauses 15-19, wherein the rotary energy conversion device includes a controller, and the method further comprises: using the controller to control first switches of the first inverter circuit to energize both the first winding segment and the second winding segment during the first mode of operation; and using the controller to control second switches of the second inverter circuit to energize the second winding segment but not the first winding segment during the second mode of operation.

Clause 21. The method of clause 20, further comprising: using the controller to control the at least one switch to couple the first inverter circuit to the second inverter circuit during the first mode of operation and to decouple the first inverter circuit from the second inverter circuit during the second mode of operation.

Clause 22. The method any of clauses 15-21, wherein: the rotary energy conversion device comprises a rotor including one or more permanent magnets configured and arranged to generate first magnetic flux within an active region of the rotary energy conversion device; the armature is included in a stator of the rotary energy conversion device; operating the first inverter circuit further includes using the first inverter circuit to energize the first winding segment and the second winding segment to generate second magnetic flux within the active region during the first mode of operation; and operating the second inverter circuit further includes using the second inverter circuit to energize the first winding segment to generate third magnetic flux within the active region during the second mode of operation.

Clause 23. The method of clause 22, wherein: the one or more permanent magnets are configured and arranged to generate the first magnetic flux generally parallel to an axis of rotation of the rotor; operating the first inverter circuit further includes using the first inverter circuit to energize the first winding segment and the second winding segment to generate the second magnetic flux generally parallel to the axis of rotation during the first mode of operation; and operating the second inverter circuit further includes using the second inverter circuit to energize the first winding segment to generate the third magnetic flux generally par-allel to the axis of rotation during the second mode of operation.

Clause 24. The method of clause 23, wherein the stator comprises a printed circuit board including conductive traces forming the first winding segment and the second winding segment.

Clause 25. The method of any of clauses 15-24, wherein the armature comprises a printed circuit board including conductive traces forming the first winding segment and the second winding segment.

Clause 26. The method of any of clauses 15-25, wherein: the armature has a wye configuration in which windings for three phases of the armature are connected at a common point; the first winding segment and the second winding segment are associated with a first phase of the three phases; and an end of the second winding segment is connected to the common point.

Clause 27. The method of clause 26, wherein: the armature further includes a third winding segment and a fourth winding segment associated with a second phase of the armature, and a fifth winding segment and a sixth winding segment associated with a third phase of the armature, the third winding segment being connected in series with the fourth winding segment, the fifth winding segment being connected in series with the sixth winding segment, and ends of the fourth winding segment and the sixth winding segment being connected to the common point; operating the first inverter circuit further includes using the first inverter circuit to energize the third winding segment, the fourth winding segment, the fifth winding segment, and the sixth winding segment during the first mode of operation; and operating the second inverter circuit further includes using the second inverter circuit to energize the fourth winding segment and the sixth winding segment, but not the third winding segment or the fifth winding segment during the second mode of operation.

Clause 28. The method of any of clauses 15-25, wherein: the armature has a delta configuration in which one or more first windings for a first phase are connected between a first tap and a second tap, one or more second windings for a second phase are connected between the second tap and a third tap, and one or more third windings for a third phase are connected between the third tap and the first tap; the first winding segment and the second winding segment are included in the one or more first windings; and operating the first inverter circuit further includes using the first inverter circuit to energize the one or more second windings and the one or more third windings during the first mode of operation.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A rotary energy conversion device, comprising:

an armature including at least a first winding segment and a second winding segment that are each configured to generate magnetic flux when energized, the second winding segment being connected in series with the first winding segment;

a first inverter circuit configured to energize both the first winding segment and the second winding segment during a first mode of operation of the rotary energy conversion device, the first inverter circuit including a first switch configured to selectively allow current to flow from a first voltage rail to a first tap for the first winding segment during the first mode of operation;

a second inverter circuit configured to energize the second winding segment but not the first winding segment during a second mode of operation of the rotary energy conversion device, the second inverter circuit including a second switch configured to selectively allow current to flow from a second voltage rail to a second tap for the second winding segment during the second mode of operation, wherein the second voltage rail is configured to be connected to a first terminal of a voltage source; and a third switch configured and arranged to allow current originating from the voltage source to flow from the second voltage rail to the first voltage rail during the first mode of operation, and to prohibit flow of current from the first voltage rail to the second voltage rail during the second mode of operation.

2. The rotary energy conversion device of claim 1, wherein:

the first inverter circuit further includes a fourth switch configured to selectively allow current to flow from the first tap to a third voltage rail during the first mode of operation;

the second inverter circuit further includes a fifth switch configured to selectively allow current to flow from the second tap to a fourth voltage rail during the second mode of operation, wherein the fourth voltage rail is configured to be connected to a second terminal of the voltage source; and the rotary energy conversion device further includes a sixth switch configured and arranged to allow current to flow from the third voltage rail to the fourth voltage rail during the first mode of operation, and to prohibit flow of current from the fourth voltage rail to the third voltage rail during the second mode of operation.

3. The rotary energy conversion device of claim 2, wherein:

the third switch includes a first diode including a first anode and a first cathode, the first anode being connected to the second voltage rail and the first cathode being connected to the first voltage rail; and the sixth switch includes a second diode including a second anode and a second cathode, the second anode being connected to the third voltage rail and the second cathode being connected to the fourth voltage rail.

4. The rotary energy conversion device of claim 3, wherein:

the first diode is a first body diode of a first transistor including a first current terminal, a second current terminal, and a first control terminal, the first current terminal being connected to the second voltage rail, the second current terminal being connected to the first voltage rail, and the first control terminal being configured and arranged to be driven to allow current flow from the first current terminal to the second current terminal during the first mode of operation; and the second diode is a second body diode of a second transistor including a third current terminal, a fourth current terminal, and a second control terminal, the third current terminal being connected to the third voltage rail, the fourth current terminal being connected to the fourth voltage rail, and the second control terminal being configured and arranged to be driven to allow current flow from the third current terminal to the fourth current terminal during the first mode of operation.

5. The rotary energy conversion device of claim 2, further comprising a controller coupled to the first inverter circuit and the second inverter circuit, the controller being configured to:

control at least the first switch and the fourth switch of the first inverter circuit to energize both the first winding segment and the second winding segment during the first mode of operation; and control at least the second switch and the fifth switch of the second inverter circuit to energize the second winding segment but not the first winding segment during the second mode of operation.

6. The rotary energy conversion device of claim 5, wherein the controller is further configured to:

control the third switch to allow current originating from the voltage source to flow from the second voltage rail to the first voltage rail during the first mode of operation;

control the sixth switch to allow current to flow from the third voltage rail to the fourth voltage rail during the first mode of operation;

control the third switch to prohibit flow of current from the first voltage rail to the second voltage rail during the second mode of operation; and control the sixth switch to prohibit flow of current from the fourth voltage rail to the third voltage rail during the second mode of operation.

7. The rotary energy conversion device of claim 2, further comprising:

a rotor including one or more permanent magnets configured and arranged to generate first magnetic flux within an active region of the rotary energy conversion device;

wherein:

the armature is included in a stator of the rotary energy conversion device;

the first winding segment and the second winding segment are configured and arranged to generate second magnetic flux within the active region when the first winding segment and the second winding segment are both energized by the first inverter circuit during the first mode of operation; and the first winding segment is configured and arranged to generate third magnetic flux within the active region when the first winding segment is energized by the second inverter circuit during the second mode of operation.

8. The rotary energy conversion device of claim 7, wherein:

the one or more permanent magnets are configured and arranged to generate the first magnetic flux generally parallel to an axis of rotation of the rotor;

the first winding segment and the second winding segment are configured and arranged to generate the second magnetic flux generally parallel to the axis of rotation when the first winding segment and the second winding segment are both energized by the first inverter circuit during the first mode of operation; and the first winding segment is configured and arranged to generate the third magnetic flux generally parallel to the axis of rotation when the first winding segment is energized by the second inverter circuit during the second mode of operation.

9. The rotary energy conversion device of claim 8, wherein the stator comprises a printed circuit board including conductive traces forming the first winding segment and the second winding segment.

10. The rotary energy conversion device of claim 2, wherein the armature comprises a printed circuit board including conductive traces forming the first winding segment and the second winding segment.

11. The rotary energy conversion device of claim 2, wherein:

the armature has a wye configuration in which windings for three phases of the armature are connected at a common point;

the first winding segment and the second winding segment are associated with a first phase of the three phases; and an end of the second winding segment is connected to the common point.

12. The rotary energy conversion device of claim 11, wherein:

the armature further includes a third winding segment and a fourth winding segment associated with a second phase of the armature, and a fifth winding segment and a sixth winding segment associated with a third phase of the armature, the third winding segment being connected in series with the fourth winding segment, the fifth winding segment being connected in series with the sixth winding segment, and ends of the fourth winding segment and the sixth winding segment being connected to the common point;

the first inverter circuit is further configured to energize the third winding segment, the fourth winding segment, the fifth winding segment, and the sixth winding segment during the first mode of operation; and the second inverter circuit is further configured to energize the fourth winding segment and the sixth winding segment, but not the third winding segment or the fifth winding segment during the second mode of operation.

13. The rotary energy conversion device of claim 2, wherein:

the armature has a delta configuration in which one or more first windings for a first phase are connected between the first tap and a third tap, one or more second windings for a second phase are connected between the third tap and a fourth tap, and one or more third windings for a third phase are connected between the fourth tap and the first tap;

the first winding segment and the second winding segment are included in the one or more first windings; and the first inverter circuit is further configured to energize the one or more second windings and the one or more third windings during the first mode of operation.

14. A method for operating a rotary energy conversion device comprising an armature including at least a first winding segment and a second winding segment that are each configured to generate magnetic flux when energized, the second winding segment being connected in series with the first winding segment, the method comprising:

operating a first inverter circuit, at least in part by controlling a first switch to selectively allow current to flow from a first voltage rail to a first tap for the first winding segment, to energize both the first winding segment and the second winding segment during a first mode of operation of the rotary energy conversion device;

operating a second inverter circuit, at least in part by controlling a second switch to selectively allow current to flow from a second voltage rail, which is connected to a first terminal of a voltage source, to a second tap for the second winding segment, to energize the second winding segment but not the first winding segment during a second mode of operation of the rotary energy conversion device; and controlling a third switch to allow current originating from the voltage source to flow from the second voltage rail to the first voltage rail during the first mode of operation, and to prohibit flow of current from the first voltage rail to the second voltage rail during the second mode of operation.

15. The method of claim 14, wherein:

operating the first inverter circuit further includes controlling a fourth switch to selectively allow current to flow from the first tap to a third voltage rail during the first mode of operation;

operating the second inverter circuit further includes controlling a fifth switch to selectively allow current to flow from the second tap to a fourth voltage rail during the second mode of operation, wherein the fourth voltage rail is connected to a second terminal of the voltage source; and the method further comprises controlling a sixth switch to allow current to flow from the third voltage rail to the fourth voltage rail during the first mode of operation, and to prohibit flow of current from the fourth voltage rail to the third voltage rail during the second mode of operation.

16. The method of claim 15, wherein:

the third switch includes a first diode including a first anode and a first cathode, the first anode being connected to the second voltage rail and the first cathode being connected to the first voltage rail; and the sixth switch includes a second diode including a second anode and a second cathode, the second anode being connected to the third voltage rail and the second cathode being connected to the fourth voltage rail.

17. The method of claim 16, wherein:

the first diode is a first body diode of a first transistor including a first current terminal, a second current terminal, and a first control terminal, the first current terminal being connected to the second voltage rail, and the second current terminal being connected to the first voltage rail;

the second diode is a second body diode of a second transistor including a third current terminal, a fourth current terminal, and a second control terminal, the third current terminal being connected to the third voltage rail, and the fourth current terminal being connected to the fourth voltage rail; and the method further comprises:

driving the first control terminal to allow current to flow from the first current terminal to the second current terminal during the first mode of operation; and driving the second control terminal to allow current to flow from the third current terminal to the fourth current terminal during the first mode of operation.

18. The method of claim 15, wherein the rotary energy conversion device includes a controller, and the method further comprises using the controller to:

control at least the first switch and the fourth switch of the first inverter circuit to energize both the first winding segment and the second winding segment during the first mode of operation; and control at least the second switch and the fifth switch of the second inverter circuit to energize the second winding segment but not the first winding segment during the second mode of operation.

19. The method of claim 18, further comprising using the controller to:

control the third switch to allow current originating from the voltage source to flow from the second voltage rail to the first voltage rail during the first mode of operation;

control the sixth switch to allow current to flow from the third voltage rail to the fourth voltage rail during the first mode of operation;

control the third switch to prohibit flow of current from the first voltage rail to the second voltage rail during the second mode of operation; and control the sixth switch to prohibit flow of current from the fourth voltage rail to the third voltage rail during the second mode of operation.

20. The method of claim 15, wherein:

the rotary energy conversion device comprises a rotor including one or more permanent magnets configured and arranged to generate first magnetic flux within an active region of the rotary energy conversion device;

the armature is included in a stator of the rotary energy conversion device;

operating the first inverter circuit further includes using the first inverter circuit to energize the first winding segment and the second winding segment to generate second magnetic flux within the active region during the first mode of operation; and operating the second inverter circuit further includes using the second inverter circuit to energize the first winding segment to generate third magnetic flux within the active region during the second mode of operation.

21. The method of claim 20, wherein:

the one or more permanent magnets are configured and arranged to generate the first magnetic flux generally parallel to an axis of rotation of the rotor;

operating the first inverter circuit further includes using the first inverter circuit to energize the first winding segment and the second winding segment to generate the second magnetic flux generally parallel to the axis of rotation during the first mode of operation; and operating the second inverter circuit further includes using the second inverter circuit to energize the first winding segment to generate the third magnetic flux generally parallel to the axis of rotation during the second mode of operation.

22. The method of claim 21, wherein the stator comprises a printed circuit board including conductive traces forming the first winding segment and the second winding segment.

23. The method of claim 15, wherein the armature comprises a printed circuit board including conductive traces forming the first winding segment and the second winding segment.

24. The method of claim 15, wherein:
the armature has a wye configuration in which windings for three phases of the armature are connected at a common point;
the first winding segment and the second winding segment are associated with a first phase of the three phases; and
an end of the second winding segment is connected to the common point.

25. The method of claim 24, wherein:
the armature further includes a third winding segment and a fourth winding segment associated with a second phase of the armature, and a fifth winding segment and a sixth winding segment associated with a third phase of the armature, the third winding segment being connected in series with the fourth winding segment, the fifth winding segment being connected in series with the sixth winding segment, and ends of the fourth winding segment and the sixth winding segment being connected to the common point;
operating the first inverter circuit further includes using the first inverter circuit to energize the third winding segment, the fourth winding segment, the fifth winding segment, and the sixth winding segment during the first mode of operation; and
operating the second inverter circuit further includes using the second inverter circuit to energize the fourth winding segment and the sixth winding segment, but not the third winding segment or the fifth winding segment during the second mode of operation.

26. The method of claim 15, wherein:
the armature has a delta configuration in which one or more first windings for a first phase are connected between the first tap and a third tap, one or more second windings for a second phase are connected between the third tap and a fourth tap, and one or more third windings for a third phase are connected between the fourth tap and the first tap;

the first winding segment and the second winding segment are included in the one or more first windings; and
operating the first inverter circuit further includes using the first inverter circuit to energize the one or more second windings and the one or more third windings during the first mode of operation.

27. A rotary energy conversion device, comprising:
an armature including at least a first winding segment and a second winding segment that are each configured to generate magnetic flux when energized, the second winding segment being connected in series with the first winding segment;
a first inverter circuit configured to energize both the first winding segment and the second winding segment during a first mode of operation of the rotary energy conversion device, the first inverter circuit including a first switch configured to selectively allow current to flow from a first tap for the first winding segment to first voltage rail during the first mode of operation;
a second inverter circuit configured to energize the second winding segment but not the first winding segment during a second mode of operation of the rotary energy conversion device, the second inverter circuit including a second switch configured to selectively allow current to flow from a second tap for the second winding segment to a second voltage rail during the second mode of operation, wherein the second voltage rail is configured to be connected to a terminal of a voltage source; and
a third switch configured and arranged to allow current to flow from the first voltage rail to the second voltage rail during the first mode of operation, and to prohibit flow of current from the second voltage rail to the first voltage rail during the second mode of operation.

28. The rotary energy conversion device of claim 27, further comprising a controller coupled to the first inverter circuit and the second inverter circuit, the controller being configured to:
control at least the first switch of the first inverter circuit to energize both the first winding segment and the second winding segment during the first mode of operation;
control at least the second switch of the second inverter circuit to energize the second winding segment but not the first winding segment during the second mode of operation;
control the third switch to allow current to flow from the first voltage rail to the second voltage rail during the first mode of operation; and
control the third switch to prohibit flow of current from the second voltage rail to the first voltage rail during the second mode of operation.

* * * * *